(12) United States Patent
Diorio et al.

(10) Patent No.: US 8,279,045 B2
(45) Date of Patent: Oct. 2, 2012

(54) RFID TAG CHIPS AND TAGS REFRAINING FROM PARTICIPATING IN A SUBSEQUENT INVENTORYING ATTEMPT AND METHODS

(75) Inventors: Christopher J. Diorio, Shoreline, WA (US); Paul Dietrich, Seattle, WA (US); Theron Stanford, Seattle, WA (US); Chad Lindhorst, Seattle, WA (US); Kambiz Rahimi, Bellevue, WA (US); Ali Aiouaz, Mission Viejo, CA (US); Aanand Esterberg, Seattle, WA (US)

(73) Assignee: Impinj, Inc., Seattle, WA (US)

( * ) Notice: Subject to any disclaimer, the term of this patent is extended or adjusted under 35 U.S.C. 154(b) by 1061 days.

(21) Appl. No.: 12/057,467

(22) Filed: Mar. 28, 2008

(65) Prior Publication Data
US 2008/0258916 A1     Oct. 23, 2008

Related U.S. Application Data

(60) Provisional application No. 60/920,686, filed on Mar. 29, 2007, provisional application No. 60/932,627, filed on May 31, 2007, provisional application No. 61/005,249, filed on Dec. 4, 2007.

(51) Int. Cl.
   *H04Q 5/22* (2006.01)
(52) U.S. Cl. .............. 340/10.1; 340/10.2; 340/572.1
(58) Field of Classification Search .............. 340/10.1, 340/10.2, 10.32, 10.5, 572.1, 572.4; 342/44, 342/51
See application file for complete search history.

(56) References Cited

U.S. PATENT DOCUMENTS

| | | | |
|---|---|---|---|
| 5,841,770 A * | 11/1998 | Snodgrass et al. | 370/346 |
| 5,942,987 A * | 8/1999 | Heinrich et al. | 340/10.42 |
| 6,812,852 B1 | 11/2004 | Cesar | 340/825.69 |
| 2004/0066281 A1* | 4/2004 | Hughes et al. | 340/10.2 |
| 2005/0242921 A1* | 11/2005 | Zimmerman et al. | 340/5.2 |
| 2005/0280507 A1* | 12/2005 | Diorio et al. | 340/10.1 |
| 2008/0018431 A1* | 1/2008 | Turner et al. | 340/10.2 |
| 2008/0180221 A1* | 7/2008 | Tuttle | 340/10.2 |

OTHER PUBLICATIONS

EPC Class-1 Generation-2 UHF RFID Protocol for Communications at 860-960 MHz version 1.0.8, EPCglobal, Dec. 14, 2004.*
Final Office Action U.S. Appl. No. 12/057,509, mailed Nov. 3, 2011.
Non-Final Office Action U.S. Appl. No. 12/057,509 mailed Jun. 23, 2011.

* cited by examiner

Primary Examiner — Edwin Holloway, III
(74) Attorney, Agent, or Firm — Turk IP Law, LLC

(57) ABSTRACT

RFID tags and chips for RFID tags are capable of being inventoried in one or more early attempts. These tags are capable of then refraining from participating in one or more subsequent inventorying attempts. In some embodiments refraining is performed solely by the tag, while in others it is guided by the RFID reader. In some embodiments, an inventoried indicator in the tag becomes updated upon backscattering. The updated value is used by the tag to recognize a subsequent attempt, and thus refrain from participating in it. This permits the subsequent attempt to be used more intensively for inventorying the more elusive, harder-to-read tags, especially in more demanding scenarios.

18 Claims, 15 Drawing Sheets

RFID TAG CIRCUIT COMPONENTS

UPDATING INVENTORIED INDICATOR WITH SERIAL NUMBER OF INVENTORYING ATTEMPT

*RFID SYSTEM*

*RFID TAG*

SIGNAL PATH DURING R→T

SIGNAL PATH DURING T→R

*RFID READER SYSTEM DETAIL*

RFID READER SYSTEM CONFIGURATION WITH OPTIONAL LOCAL AND REMOTE COMPONENTS

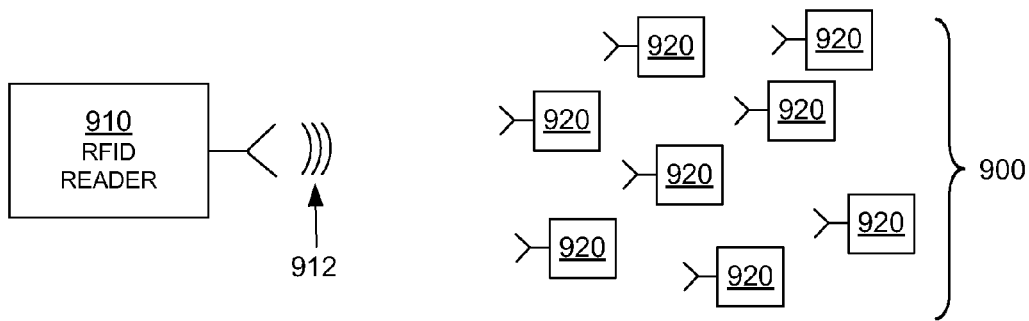
FIG. 9 (PRIOR ART)  *RFID READER INVENTORYING TAG POPULATION - EASIER READING CONDITIONS*
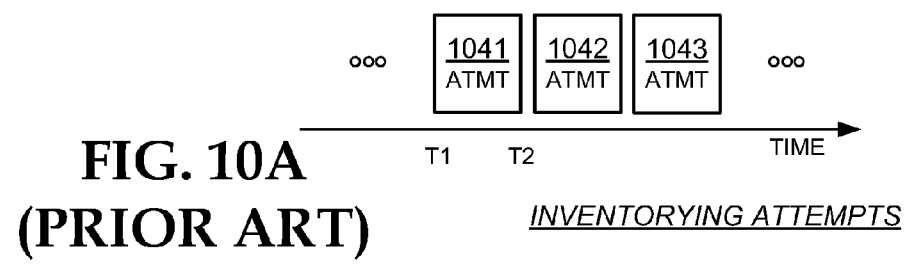
FIG. 10A (PRIOR ART)  *INVENTORYING ATTEMPTS*
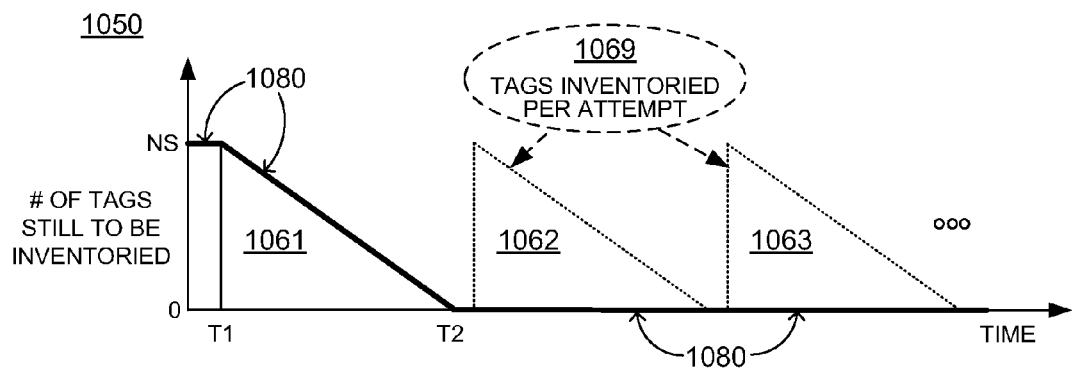
FIG. 10B (PRIOR ART)  *INVENTORYING TAGS - EASIER READING CONDITIONS*

*RFID READER INVENTORYING TAG POPULATION - MORE DEMANDING READING CONDITIONS*

*INVENTORYING TAGS - SOME HARDER TO READ THAN OTHERS*

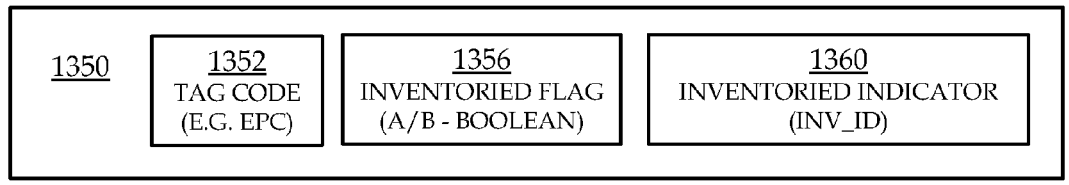
FIG. 13   *TAG MEMORY CONTENTS*
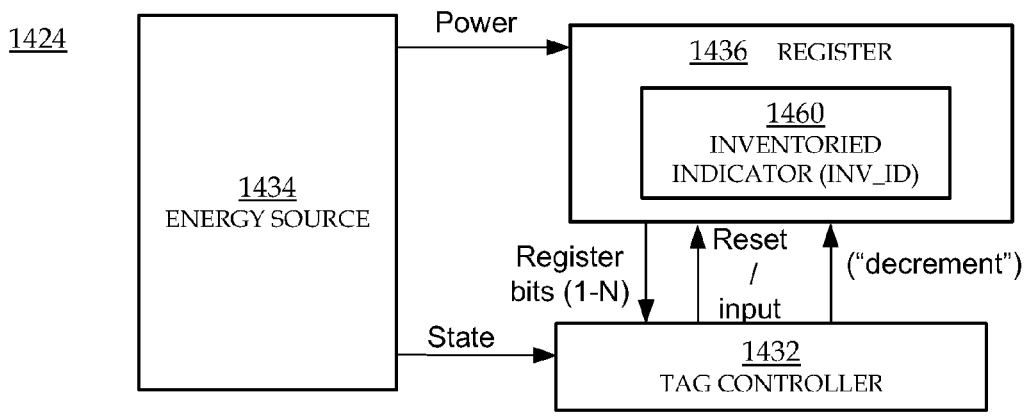
FIG. 14   *RFID TAG CIRCUIT COMPONENTS*
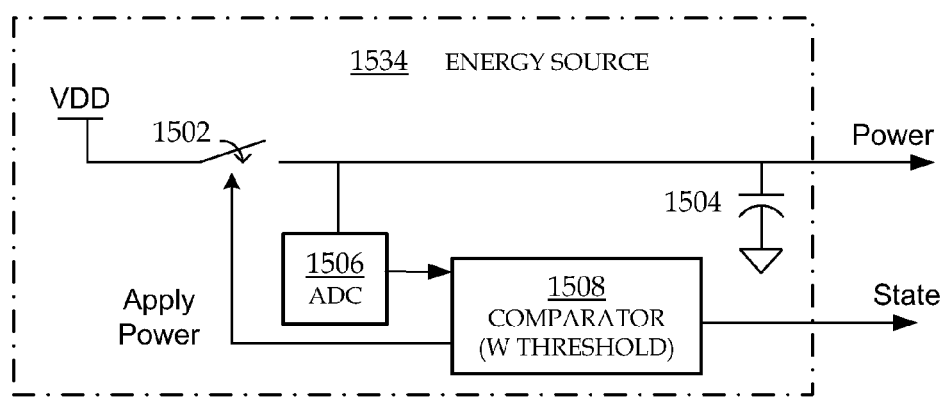
FIG. 15   *RFID TAG CIRCUIT COMPONENTS*

UPDATING INVENTORIED INDICATOR
WITH SERIAL NUMBER OF
INVENTORYING ATTEMPT

UPDATING INVENTORIED INDICATOR
WITH INSTRUCTION FOR COUNTER

INVENTORYING TAGS THAT CAN REFRAIN FROM OVERLY PARTICIPATING IN INVENTORYING ATTEMPTS

INVENTORYING ATTEMPTS

INVENTORYING ATTEMPTS

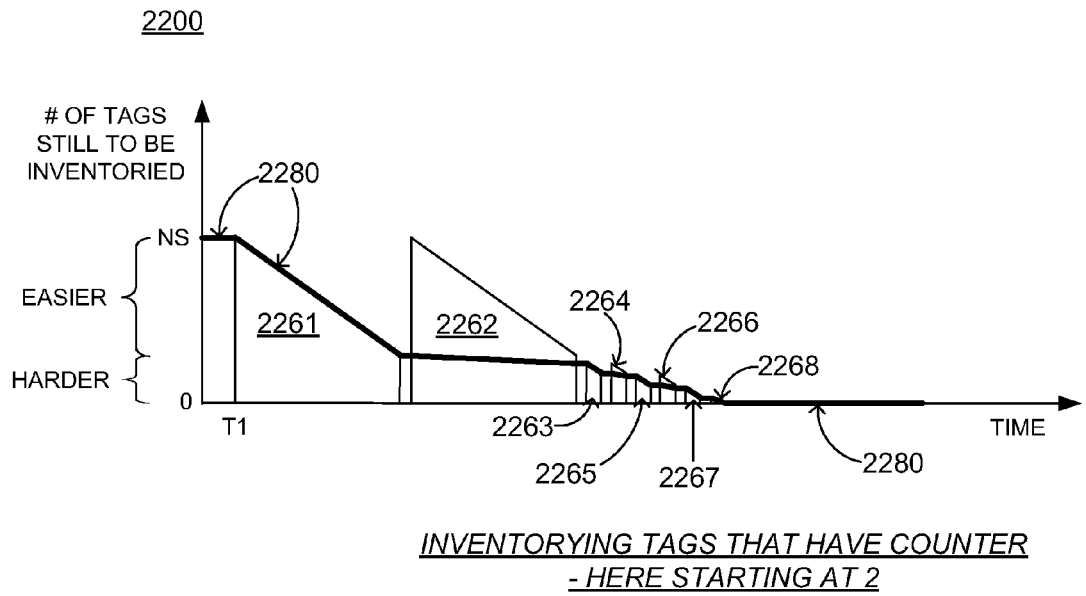
FIG. 22      INVENTORYING TAGS THAT HAVE COUNTER - HERE STARTING AT 2
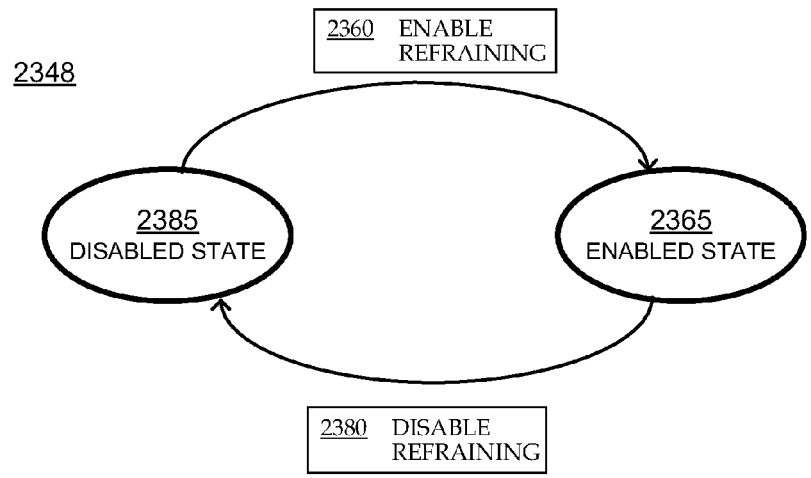
FIG. 23      STATE DIAGRAM FOR CUSTOM FEATURE

*TRANSMITTED COMMANDS TO FACILITATE TAGS TO REFRAIN FROM BEING OVERLY INVENTORIED*

*READER SYSTEM COMPONENT METHODS*

| ITEM | COMMAND | TARGET | ACTION | MEMBANK | POINTER | LENGTH | MASK | TRUNCATE | CRC-16 |
|---|---|---|---|---|---|---|---|---|---|
| # OF BITS | 4 | 3 | 3 | 2 | EBV | 8 | VARIABLE | 1 | 16 |
| DESCR. | 1010 | 000: Inventoried (S0)<br>001: Inventoried (S1)<br>010: Inventoried (S2)<br>011: Inventoried (S3)<br>100: SL<br>101: RFU<br>110: RFU<br>111: RFU | See Table 6.18 | 00: RFU<br>01: EPC<br>10: TID<br>11: User | Starting Mask address | Mask length (bits) | Mask value | 0: Disable truncation<br>1: Enable truncation | |

*TABLE 6.17 - SELECT COMMAND OF THE GEN2 SPEC VERSION 1.1.0*

FIG. 26A

| | | | Mask | | | | |
|---|---|---|---|---|---|---|---|
| Membank | Pointer | Length | FEF | | ... | FCF | Data |
| | | | Subfield_1 | Subfield_N | | Command code | |
| # of bits | 2 | EBV | 8 | Variable | Variable | | 5 | Variable |
| description | - | - | - | - | - | | - | - |

*SUBDIVIDING THE MASK FIELD*

FIG. 26B

| | | | Mask | | | FCF | Data |
|---|---|---|---|---|---|---|---|
| Membank | Pointer | Length | FEF | | | Command code | |
| | | | Class ID | MDID | Indicator | | |
| # of bits | 2 | EBV | 8 | 2 | 12 | 1 | 5 | Variable |
| description | 10 | 06h | 14h | 10 | 000000000001 | 1 | 00000 | - |

*EXAMPLE*

FIG. 26C

RFID TAG CHIPS AND TAGS REFRAINING FROM PARTICIPATING IN A SUBSEQUENT INVENTORYING ATTEMPT AND METHODS

CROSS REFERENCE TO RELATED APPLICATIONS

This application claims priority from U.S.A. Provisional Application No. 60/920,686, filed on 2007 Mar. 29, the disclosure of which is hereby incorporated by reference for all purposes.

This application claims priority from U.S.A. Provisional Application No. 60/932,627, filed on 2007 May 31, the disclosure of which is hereby incorporated by reference for all purposes.

This application claims priority from U.S.A. Provisional Application No. 61/005,249, filed on 2007 Dec. 4, the disclosure of which is hereby incorporated by reference for all purposes.

FIELD OF THE INVENTION

The present description addresses the field of Radio Frequency IDentification (RFID) systems.

BACKGROUND

Radio Frequency IDentification (RFID) systems typically include RFID tags and RFID readers. RFID readers are also known as RFID reader/writers or RFID interrogators. RFID systems can be used in many ways for locating and identifying objects to which the tags are attached. RFID systems are particularly useful in product-related and service-related industries for tracking objects being processed, inventoried, or handled. In such cases, an RFID tag is usually attached to an individual item, or to its package.

In principle, RFID techniques entail using an RFID reader to interrogate one or more RFID tags. The reader transmitting a Radio Frequency (RF) wave performs the interrogation. The RF wave is typically electromagnetic, at least in the far field. The RF wave can also be predominantly electric or magnetic in the near field.

A tag that senses the interrogating RF wave responds by transmitting back another RF wave. The tag generates the transmitted back RF wave either originally, or by reflecting back a portion of the interrogating RF wave in a process known as backscatter. Backscatter may take place in a number of ways.

The reflected-back RF wave may further encode data stored internally in the tag, such as a number. The response is demodulated and decoded by the reader, which thereby identifies, counts, or otherwise interacts with the associated item. The decoded data can denote a serial number, a price, a date, a destination, other attribute(s), any combination of attributes, and so on.

An RFID tag typically includes an antenna system, a radio section, a power management section, and frequently a logical section, a memory, or both. In earlier RFID tags, the power management section included an energy storage device, such as a battery. RFID tags with an energy storage device are known as active or semi-active tags. Advances in semiconductor technology have miniaturized the electronics so much that an RFID tag can be powered solely by the RF signal it receives. Such RFID tags do not include an energy storage device, and are called passive tags.

Problems arise when more and more tags are desired to be inventoried, in less and less time. There is less time as tags are moving.

An emerging pattern is that some tags are occasionally harder to read than others, even with repeated inventorying attempts. Such tags could be, for example, in the center of a large group. This pattern can become a problem when there is less time to read the group, such as when the group is moving past the antennas without stopping.

BRIEF SUMMARY

The invention improves over the prior art.

Briefly, the present invention provides RFID tags and chips for RFID tags that are capable of being inventoried in one or more early attempts. These tags are capable of then refraining from participating in one or more subsequent inventorying attempts. In some embodiments refraining is performed solely by the tag, while in others it is guided by the RFID reader.

The invention offers the advantage that, when these tags refrain from participating in the subsequent attempts, they permit these attempts to be used more intensively for inventorying the more elusive, harder-to-read tags, especially in more demanding scenarios.

These and other features and advantages of the invention will be better understood from the specification of the invention, which includes the following Detailed Description and accompanying Drawings.

BRIEF DESCRIPTION OF THE DRAWINGS

The following Detailed Description proceeds with reference to the accompanying Drawings, in which:

FIG. 9 is a diagram that illustrates a scenario of an RFID reader tasked with inventorying RFID tags under easier reading conditions.

FIG. 10A is a time diagram showing repeated inventorying attempts that the reader of FIG. 9 might transmit to read the tags of FIG. 9, each attempt including at least one command.

FIG. 10B is a time diagram showing how the tags of FIG. 9 might be read by the reader of FIG. 9 using the inventorying attempts of FIG. 10A.

FIG. 13 is a diagram illustrating memory contents of an RFID tag according to embodiments.

FIG. 14 is a block diagram of a circuit showing how an inventoried indicator of FIG. 13 can be stored according to embodiments.

FIG. 15 is a more detailed schematic circuit diagram for an embodiment of an energy source shown in FIG. 14.

FIG. 22 is a time diagram illustrating tags being read, where some tags are harder to read than others, but where also the tags limit themselves to participating in only two inventorying attempts and then refrain, according to embodiments.

FIG. 23 is an optional partial state diagram of a state machine of a tag having an electrical circuit as shown in FIG. 4.

FIG. 26A is a table illustrating the fields of the Select command of the Gen2 Spec version 1.1.0, versions of which may be used as any one or more of the commands of FIG. 24 according to embodiments.

FIG. 26B is a table illustrating how a number of custom commands can be enabled in a reader and a tag.

FIG. 26C is a table showing sample values that can be used for the table of FIG. 26B.

DETAILED DESCRIPTION

Figure 1:
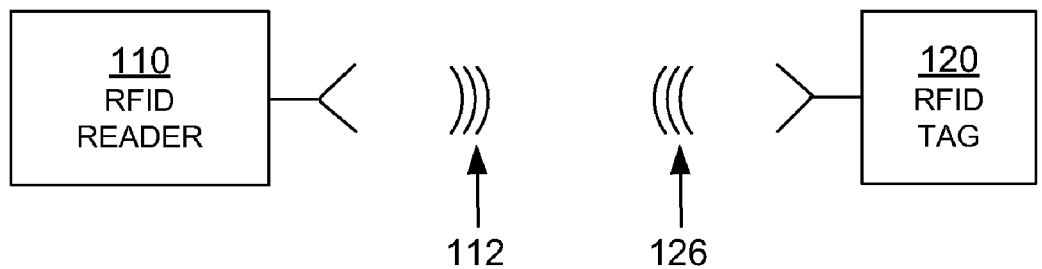
FIG. 1 is a block diagram of components of an RFID system.

The present invention is now described. While it is disclosed in its preferred form, the specific embodiments of the invention as disclosed herein and illustrated in the drawings are not to be considered in a limiting sense. Rather, these embodiments are provided so that this disclosure will be thorough and complete, and will fully convey the scope of the invention to those skilled in the art. Indeed, it should be readily apparent in view of the present description that the invention may be modified in numerous ways. Among other things, the present invention may be embodied as devices, methods, software, and so on. Accordingly, the present invention may take the form of an entirely hardware embodiment, an entirely software embodiment, an entirely firmware embodiment, or an embodiment combining aspects of the above. This description is, therefore, not to be taken in a limiting sense.

FIG. 1 is a diagram of components of a typical RFID system 100, incorporating aspects of the invention. An RFID reader 110 transmits an interrogating Radio Frequency (RF) wave 112. RFID tag 120 in the vicinity of RFID reader 110 may sense interrogating RF wave 112, and generate wave 126 in response. RFID reader 110 senses and interprets wave 126.

Reader 110 and tag 120 exchange data via wave 112 and wave 126. In a session of such an exchange, each encodes, modulates, and transmits data to the other, and each receives, demodulates, and decodes data from the other. The data is modulated onto, and demodulated from, RF waveforms.

Encoding the data in waveforms can be performed in a number of different ways. For example, protocols are devised to communicate in terms of symbols, also called RFID symbols. A symbol for communicating can be a delimiter, a calibration symbol, and so on. Further symbols can be implemented for ultimately exchanging binary data, such as "0" and "1", if that is desired. In turn, when the waveforms are processed internally by reader 110 and tag 120, they can be equivalently considered and treated as numbers having corresponding values, and so on.

Tag 120 can be a passive tag or an active or semi-active tag, i.e. having its own power source. Where tag 120 is a passive tag, it is powered from wave 112.

Figure 2:
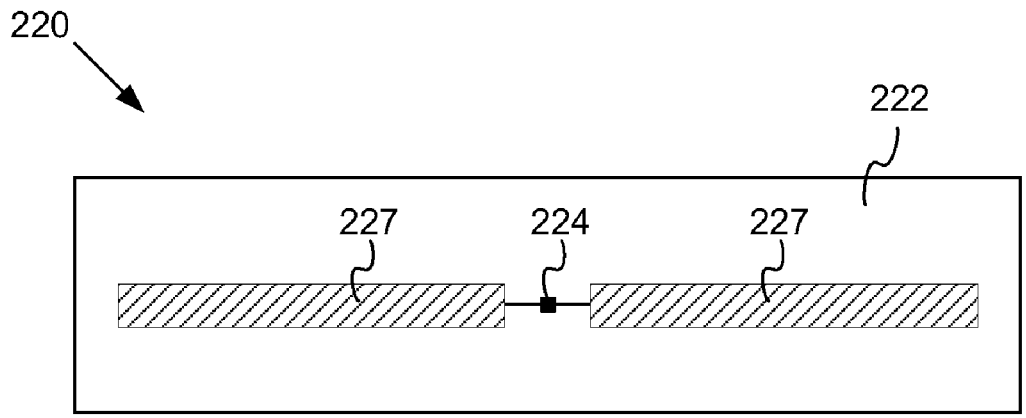
FIG. 2 is a diagram showing components of a passive RFID tag, such as a tag that can be used in the system of FIG. 1.

FIG. 2 is a diagram of an RFID tag 220, which can be the same as tag 120 of FIG. 1. Tag 220 is implemented as a passive tag, meaning it does not have its own power source. Much of what is described in this document, however, applies also to active tags.

Tag 220 is formed on a substantially planar inlay 222, which can be made in many ways known in the art. Tag 220 includes an electrical circuit, which is preferably implemented in an integrated circuit (IC) 224. IC 224 is arranged on inlay 222.

Tag 220 also includes an antenna for exchanging wireless signals with its environment. The antenna is usually flat and attached to inlay 222. IC 224 is electrically coupled to the antenna via suitable antenna ports (not shown in FIG. 2).

The antenna may be made in a number of ways, as is well known in the art. In the example of FIG. 2, the antenna is made from two distinct antenna segments 227, which are shown here forming a dipole. Many other embodiments are possible, using any number of antenna segments.

In some embodiments, an antenna can be made with even a single segment. Different points of the segment can be coupled to one or more of the antenna ports of IC 224. For example, the antenna can form a single loop, with its ends coupled to the ports. It should be remembered that, when the single segment has more complex shapes, even a single segment could behave like multiple segments, at the frequencies of RFID wireless communication.

In operation, a signal is received by the antenna, and communicated to IC 224. IC 224 both harvests power, and responds if appropriate, based on the incoming signal and its internal state. In order to respond by replying, IC 224 modulates the reflectance of the antenna, which generates the backscatter from a wave transmitted by the reader. Coupling together and uncoupling the antenna ports of IC 224 can modulate the reflectance, as can a variety of other means.

In the embodiment of FIG. 2, antenna segments 227 are separate from IC 224. In other embodiments, antenna segments may alternately be formed on IC 224, and so on.

The components of the RFID system of FIG. 1 may communicate with each other in any number of modes. One such mode is called full duplex. Another such mode is called half-duplex, and is described below.

Figure 3:
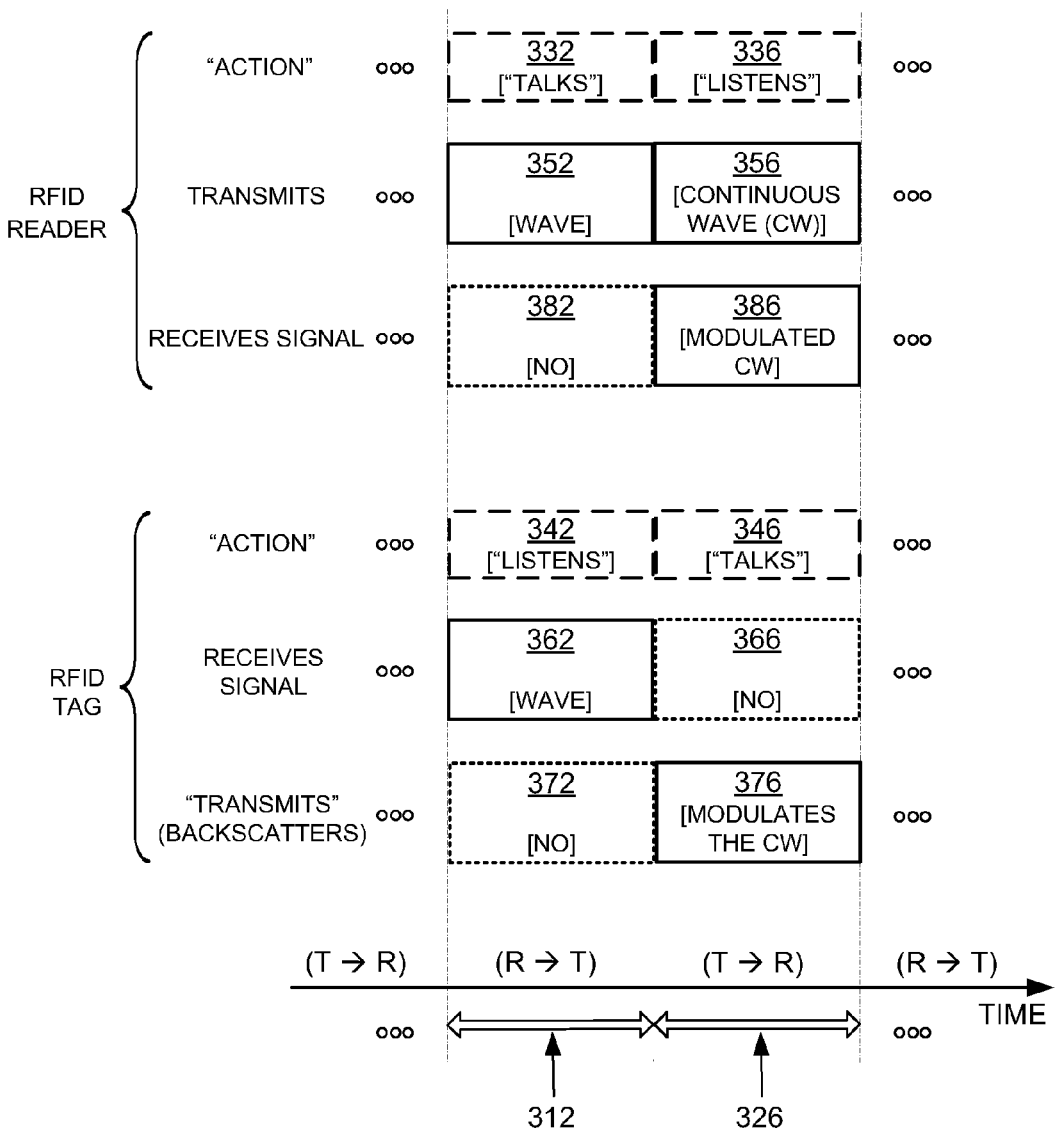
FIG. 3 is a conceptual diagram for explaining a half-duplex mode of communication between the components of the RFID system of FIG. 1.

FIG. 3 is a conceptual diagram 300 for explaining the half-duplex mode of communication between the components of the RFID system of FIG. 1, especially when tag 120 is implemented as passive tag 220 of FIG. 2. The explanation is made with reference to a TIME axis, and also to a human metaphor of "talking" and "listening". The actual technical implementations for "talking" and "listening" are now described.

RFID reader 110 and RFID tag 120 talk and listen to each other by taking turns. As seen on axis TIME, when reader 10 talks to tag 120 the communication session is designated as "R→T", and when tag 120 talks to reader 110 the communication session is designated as "T→R". Along the TIME axis, a sample R→T communication session occurs during a time interval 312, and a following sample T→R communication session occurs during a time interval 326. Of course interval 312 is typically of a different duration than interval 326 here the durations are shown approximately equal only for purposes of illustration.

According to blocks 332 and 336, RFID reader 110 talks during interval 312, and listens during interval 326. According to blocks 342 and 346, RFID tag 120 listens while reader 110 talks (during interval 312), and talks while reader 110 listens (during interval 326).

In terms of actual technical behavior, during interval 312, reader 110 talks to tag 120 as follows. According to block 352, reader 110 transmits wave 112, which was first described in FIG. 1. At the same time, according to block 362, tag 120 receives wave 112 and processes it, to extract data and so on. Meanwhile, according to block 372, tag 120 does not backscatter with its antenna, and according to block 382, reader 110 has no wave to receive from tag 120.

During interval 326, tag 120 talks to reader 110 as follows. According to block 356, reader 110 transmits a Continuous Wave (CW), which can be thought of as a carrier signal that ideally encodes no information. As discussed before, this carrier signal serves both to be harvested by tag 120 for its own internal power needs, and also as a wave that tag 120 can backscatter. Indeed, during interval 326, according to block 366, tag 120 does not receive a signal for processing. Instead, according to block 376, tag 120 modulates the CW emitted according to block 356, so as to generate backscatter wave 126. Concurrently, according to block 386, reader 110 receives backscatter wave 126 and processes it.

In the above, an RFID reader/interrogator may communicate with one or more RFID tags in any number of ways. Some such ways are called protocols. A protocol is a specification that calls for specific manners of signaling between the reader and the tags.

One such protocol is called the Specification for RFID Air Interface-EPC™ Radio-Frequency Identity Protocols Class-1 Generation-2 UHF RFID Protocol for Communications at 860 MHz 960 MHz, which is also colloquially known as "the Gen2 Spec". The Gen2 Spec has been ratified by EPCglobal, which is an organization that maintains a website at: <http://www.epcglobalinc.org/> at the time this document is initially filed with the USPTO. Version 1.1.0 of the Gen2 Spec is hereby incorporated by reference in its entirety.

In addition, a protocol can be a variant of a stated specification such as the Gen2 Spec, for example including fewer or additional commands than the stated specification calls for, and so on. In such instances, additional commands are sometimes called custom commands.

Figure 4:
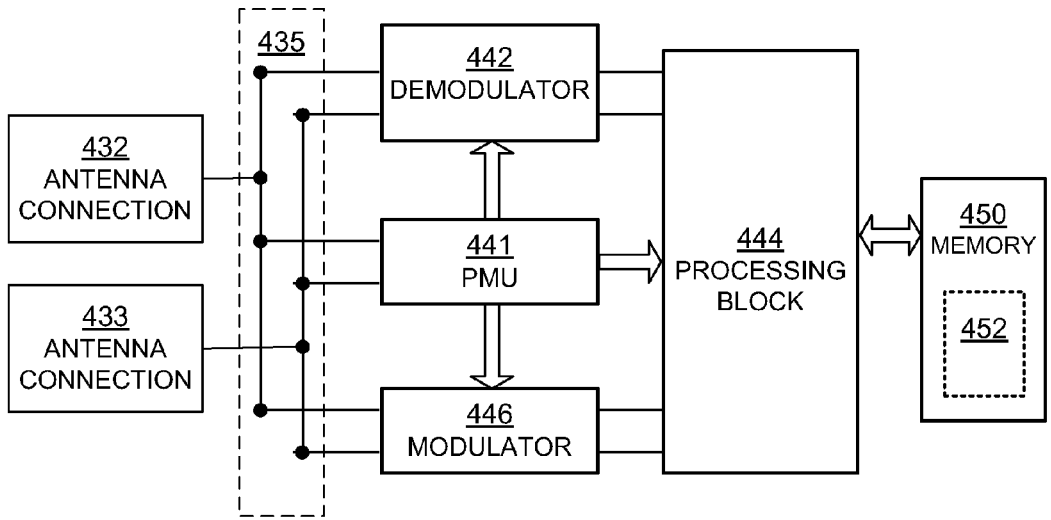
FIG. 4 is a block diagram of an implementation of an electrical circuit formed in an IC of the tag of FIG. 2.

FIG. 4 is a block diagram of an electrical circuit 424. Circuit 424 may be formed in an IC of an RFID tag, such as IC 224 of FIG. 2. Circuit 424 has a number of main components that are described in this document. Circuit 424 may have a number of additional components from what is shown and described, or different components, depending on the exact implementation.

Circuit 424 includes at least two antenna connections 432, 433, which are suitable for coupling to one or more antenna segments (not shown in FIG. 4). Antenna connections 432, 433 may be made in any suitable way, such as using pads and so on. In a number of embodiments more than two antenna connections are used, especially in embodiments where more antenna segments are used.

Circuit 424 includes a section 435. Section 435 may be implemented as shown, for example as a group of nodes for proper routing of signals. In some embodiments, section 435 may be implemented otherwise, for example to include a receive/transmit switch that can route a signal, and so on.

Circuit 424 also includes a Power Management Unit (PMU) 441. PMU 441 may be implemented in any way known in the art, for harvesting raw RF power received via antenna connections 432, 433. In some embodiments, PMU 441 includes at least one rectifier, and so on.

In operation, an RF wave received via antenna connections 432, 433 is received by PMU 441, which in turn generates power for components of circuit 424. This is true for either or both R→T and T→R sessions, whether or not the received RF wave is modulated.

Circuit 424 additionally includes a demodulator 442. Demodulator 442 demodulates an RF signal received via antenna connections 432, 433. Demodulator 442 may be implemented in any way known in the art, for example including an attenuator stage, an amplifier stage, and so on.

Circuit 424 further includes a processing block 444. Processing block 444 receives the demodulated signal from demodulator 442, and may perform operations. In addition, it may generate an output signal for transmission.

Processing block 444 may be implemented in any way known in the art. For example, processing block 444 may include a number of components, such as a processor, memory, a decoder, an encoder, and so on.

Circuit 424 additionally includes a modulator 446. Modulator 446 modulates an output signal generated by processing block 444. The modulated signal is transmitted by driving antenna connections 432, 433, and therefore driving the load presented by the coupled antenna segment or segments. Modulator 446 may be implemented in any way known in the art, for example including a driver stage, amplifier stage, and so on.

In one embodiment, demodulator 442 and modulator 446 may be combined in a single transceiver circuit. In another embodiment, modulator 446 may include a backscatter transmitter or an active transmitter. In yet other embodiments, demodulator 442 and modulator 446 are part of processing block 444.

Circuit 424 additionally includes a memory 450, which stores data 452. Memory 450 is preferably implemented as a Nonvolatile Memory (NVM), which means that data 452 is retained even when circuit 424 does not have power, as is frequently the case for a passive RFID tag.

It will be recognized at this juncture that the shown components of circuit 424 can be those of a circuit of an RFID reader according to the invention, with or without needing PMU 441. Indeed, an RFID reader can be powered differently, such as from a wall outlet, a battery, and so on. Additionally, when circuit 424 is configured as a reader, processing block 444 may have additional Inputs/Outputs (I/O) to a terminal, network, or other such devices or connections.

In terms of processing a signal, circuit 424 operates differently during a R→T session and a T→R session. The different operations are described below, in this case with circuit 424 representing an RFID tag.

Figure 5A:
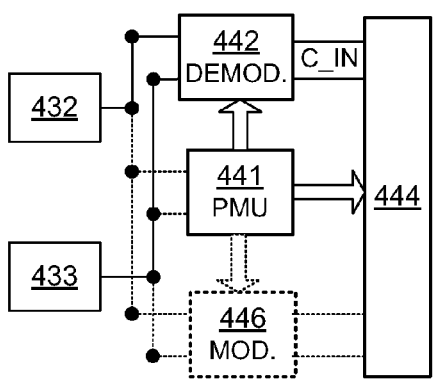
FIG. 5A is block diagram of components of the circuit of FIG. 4, modified to emphasize a signal operation during a R→T session of FIG. 3.

FIG. 5A shows version 524-A of components of circuit 424 of FIG. 4, further modified to emphasize a signal operation during a R→T session (receive mode of operation) during time interval 312 of FIG. 3. An RF wave is received from antenna connections 432, 433, and then a signal is demodulated from demodulator 442, and then input to processing block 444 as C_IN. In one embodiment according to the present invention, C_IN may include a received stream of symbols.

Version 524-A shows as relatively obscured those components that do not play a part in processing a signal during a R→T session. Indeed, PMU 441 may be active, but only in converting raw RF power. And modulator 446 generally does not transmit during a R→T session. Modulator 446 typically does not interact with the received RF wave significantly, either because switching action in section 435 of FIG. 4 decouples the modulator 446 from the RF wave, or by designing modulator 446 to have a suitable impedance, and so on.

While modulator 446 is typically inactive during a R→T session, it need not be always the case. For example, during a R→T session, modulator 446 could be active in other ways. For example, it could be adjusting its own parameters for operation in a future session.

Figure 5B:
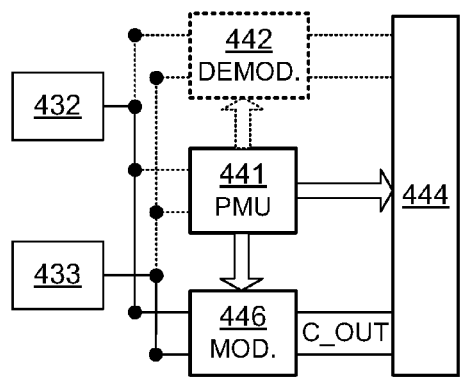
FIG. 5B is the block diagram of components of the circuit of FIG. 4, modified to emphasize a signal operation during a T→R session of FIG. 3.

FIG. 5B shows version 524-B of components of circuit 424 of FIG. 4, further modified to emphasize a signal operation during a T→R session during time interval 326 of FIG. 3. A signal is output from processing block 444 as C_OUT. In one embodiment according to the present invention, C_OUT may include a transmission stream of symbols. C_OUT is then modulated by modulator 446, and output as an RF wave via antenna connections 432, 433.

Version 524-B shows as relatively obscured those components that do not play a part in processing a signal during a T→R session. Indeed, PMU 441 may be active, but only in converting raw RF power. And demodulator 442 generally does not receive during a T→R session. Demodulator 442 typically does not interact with the transmitted RF wave, either because switching action in section 435 decouples the demodulator 442 from the RF wave, or by designing demodulator 442 to have a suitable impedance, and so on.

While demodulator 442 is typically inactive during a T→R session, it need not be always the case. For example, during a T→R session, demodulator 442 could be active in other ways. For example, it could be adjusting its own parameters for operation in a future session.

Figure 6:
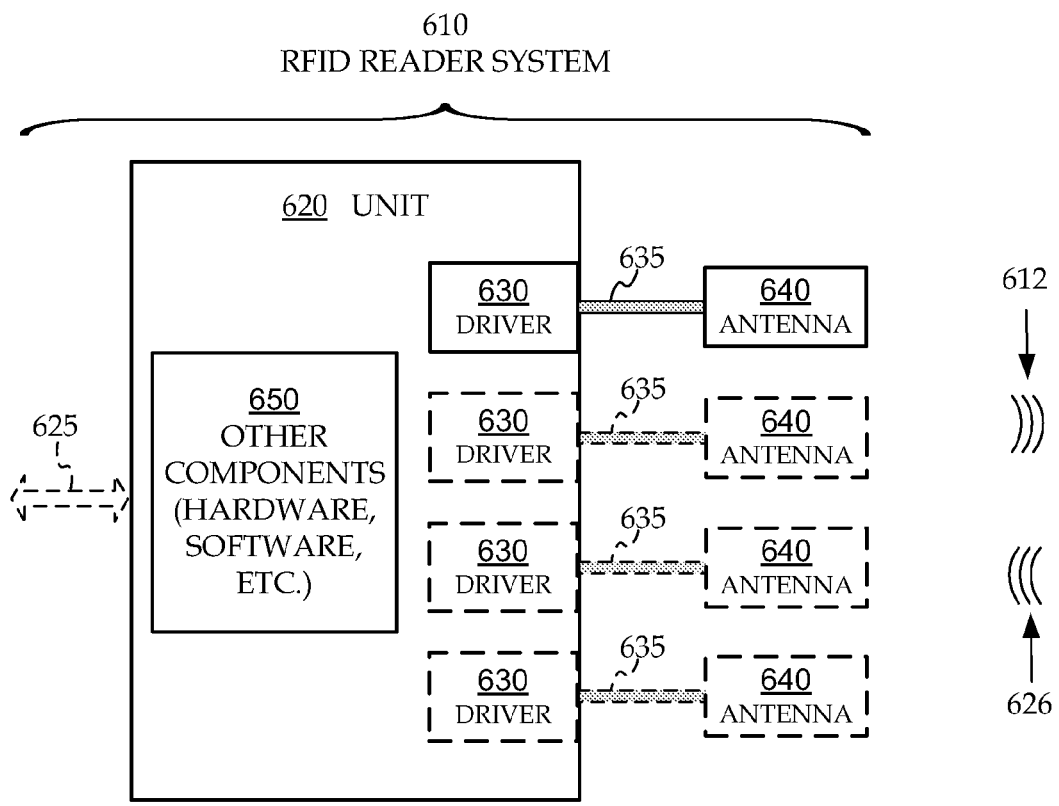
FIG. 6 is a block diagram showing a detail of an RFID reader system, such as the one shown in FIG. 1.

FIG. 6 is a block diagram showing a detail of an RFID reader system 610, which can be the same as reader 110 shown in FIG. 1. A unit 620 is also known as a box 620, and has at least one antenna driver 630. In some embodiments it has four drivers 630. For each driver 630 there is an output device for a connector. The output device is typically a coaxial cable plug. Accordingly connectors 635 can be attached to the output devices of the provided respective drivers 630, and then connectors 635 can be attached to respective antennas 640.

A driver 630 can send to its respective antenna 640 a driving signal that is in the RF range, which is why connector 635 is typically but not necessarily a coaxial cable. The driving signal causes the antenna 640 to transmit an RF wave 612, which is analogous to RF wave 112 of FIG. 1. In addition, RF wave 626 can be backscattered from the RFID tags, analogous to RF wave 126 of FIG. 1. Backscattered RF wave 626 then ultimately becomes a signal sensed by unit 620.

Unit 620 also has other components 650, such as hardware and/or software and/or firmware, which may be described in more detail later in this document. Components 650 control drivers 630, and as such cause RF wave 612 to be transmitted, and the sensed backscattered RF wave 626 to be interpreted. Optionally and preferably there is a communication link 625 to other equipment, such as computers and the like, for remote operation of system 610.

Figure 7:
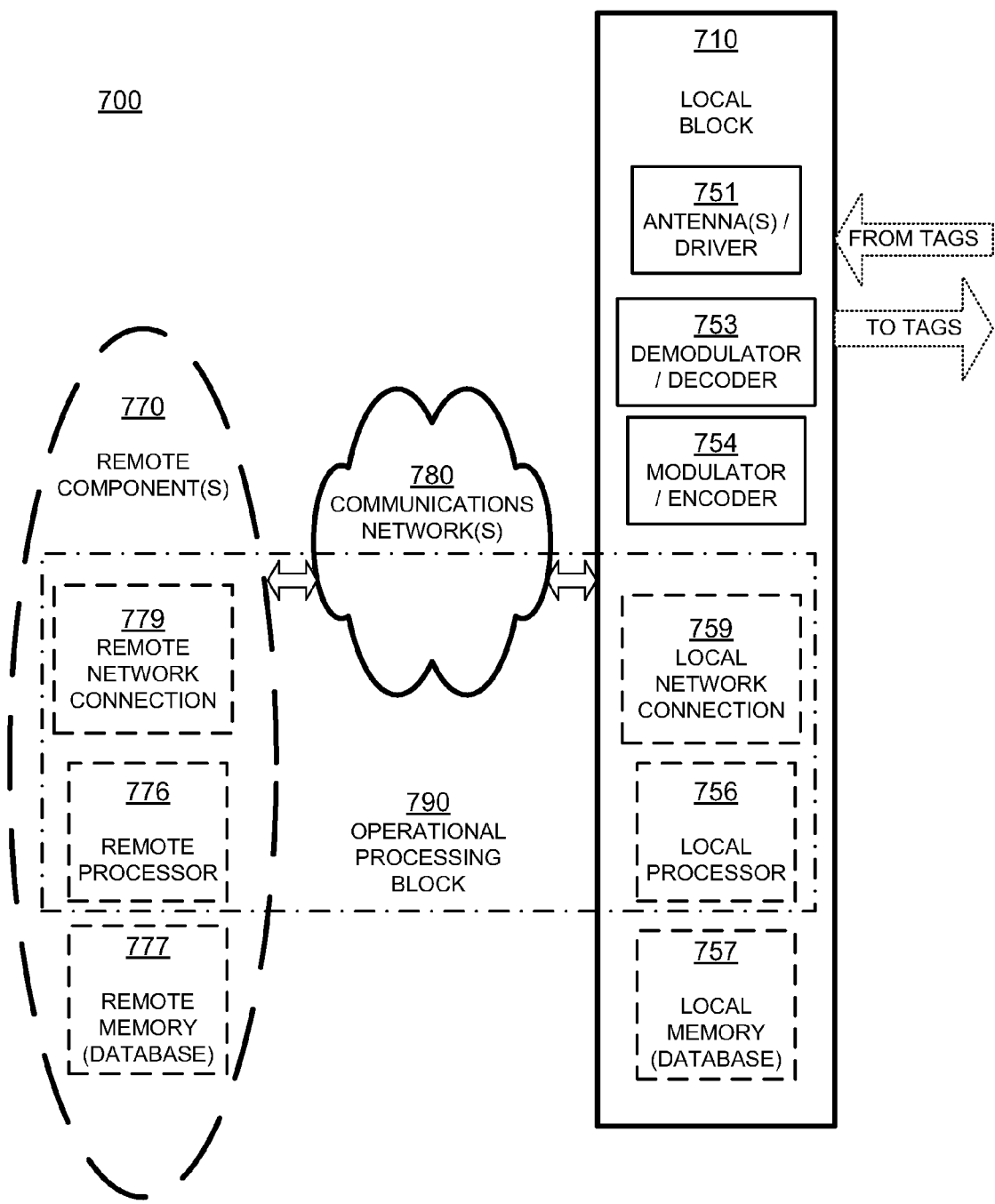
FIG. 7 is a block diagram of a whole RFID reader system according to embodiments.

FIG. 7 is a block diagram of a whole RFID reader system 700 according to embodiments. System 700 includes a local block 710, and optionally remote components 770. Local block 710 and remote components 770 can be implemented in any number of ways. It will be recognized that reader 110 of FIG. 1 is the same as local block 710, if remote components 770 are not provided. Alternately, reader 110 can be implemented instead by system 700, of which only the local block 710 is shown in FIG. 1. Plus, local block 710 can be unit 620 of FIG. 6.

Local block 710 is responsible for communicating with the tags. Local block 710 includes a block 751 of an antenna and a driver of the antenna for communicating with the tags. Some readers, like that shown in local block 710, contain a single antenna and driver. Some readers contain multiple antennas and drivers and a method to switch signals among them, including sometimes using different antennas for transmitting and for receiving. And some readers contain multiple antennas and drivers that can operate simultaneously. A demodulator/decoder block 753 demodulates and decodes backscattered waves received from the tags via antenna block 751. Modulator/encoder block 754 encodes and modulates an RF wave that is to be transmitted to the tags via antenna block 751.

Local block 710 additionally includes an optional local processor 756. Processor 756 may be implemented in any number of ways known in the art. Such ways include, by way of examples and not of limitation, digital and/or analog processors such as microprocessors and digital-signal processors (DSPs); controllers such as microcontrollers; software running in a machine such as a general purpose computer; programmable circuits such as Field Programmable Gate Arrays (FPGAs), Field-Programmable Analog Arrays (FPAAs), Programmable Logic Devices (PLDs), Application Specific Integrated Circuits (ASIC), any combination of one or more of these; and so on. In some cases some or all of the decoding function in block 753, the encoding function in block 754, or both, may be performed instead by processor 756.

Local block 710 additionally includes an optional local memory 757. Memory 757 may be implemented in any number of ways known in the art. Such ways include, by way of examples and not of limitation, nonvolatile memories (NVM), read-only memories (ROM), random access memories (RAM), any combination of one or more of these, and so on. Memory 757, if provided, can include programs for processor 756 to run, if provided.

In some embodiments, memory 757 stores data read from tags, or data to be written to tags, such as Electronic Product Codes (EPCs), Tag Identifiers (TIDs) and other data. Memory 757 can also include reference data that is to be compared to the EPC codes, instructions and/or rules for how to encode commands for the tags, modes for controlling antenna 751, and so on. In some of these embodiments, local memory 757 is provided as a database.

Some components of local block 710 typically treat the data as analog, such as the antenna/driver block 751. Other components such as memory 757 typically treat the data as digital. At some point there is a conversion between analog and digital. Based on where this conversion occurs, a whole reader may be characterized as "analog" or "digital", but most readers contain a mix of analog and digital functionality.

If remote components 770 are indeed provided, they are coupled to local block 710 via an electronic communications network 780. Network 780 can be a Local Area Network (LAN), a Metropolitan Area Network (MAN), a Wide Area Network (WAN), a network of networks such as the internet, or a mere local communication link, such as a USB, PCI, and so on. In turn, local block 710 then includes a local network connection 759 for communicating with network 780.

There can be one or more remote component(s) 770. If more than one, they can be located at the same location, or in different locations. They can access each other and local block 710 via network 780, or via other similar networks, and so on. Accordingly, remote component(s) 770 can use respective remote network connections. Only one such remote network connection 779 is shown, which is similar to local network connection 759, etc.

Remote component(s) 770 can also include a remote processor 776. Processor 776 can be made in any way known in the art, such as was described with reference to local processor 756.

Remote component(s) 770 can also include a remote memory 777. Memory 777 can be made in any way known in the art, such as was described with reference to local memory 757. Memory 777 may include a local database, and a different database of a Standards Organization, such as one that can reference EPCs.

Of the above-described elements, it is advantageous to consider a combination of these components, designated as operational processing block 790. Block 790 includes those that are provided of the following: local processor 756, remote processor 776, local network connection 759, remote network connection 779, and by extension an applicable portion of network 780 that links connection 759 with connection 779. The portion can be dynamically changeable, etc. In addition, block 790 can receive and decode RF waves received via antenna 751, and cause antenna 751 to transmit RF waves according to what it has processed.

Block 790 includes either local processor 756, or remote processor 776, or both. If both are provided, remote processor 776 can be made such that it operates in a way complementary with that of local processor 756. In fact, the two can cooperate. It will be appreciated that block 790, as defined this way, is in communication with both local memory 757 and remote memory 777, if both are present.

Accordingly, block 790 is location agnostic, in that its functions can be implemented either by local processor 756, or by remote processor 776, or by a combination of both. Some of these functions are preferably implemented by local processor 756, and some by remote processor 776. Block 790 accesses local memory 757, or remote memory 777, or both for storing and/or retrieving data.

Reader system 700 operates by block 790 generating communications for RFID tags. These communications are ultimately transmitted by antenna block 751, with modulator/encoder block 754 encoding and modulating the information on an RF wave. Then data is received from the tags via antenna block 751, demodulated and decoded by demodulator/decoder block 753, and processed by processing block 790.

The invention also includes methods. Some are methods of operation of an RFID reader or RFID reader system. Others are methods for controlling an RFID reader or RFID reader system.

These methods can be implemented in any number of ways, including the structures described in this document. One such way is by machine operations, of devices of the type described in this document.

Another optional way is for one or more of the individual operations of the methods to be performed in conjunction with one or more human operators performing some of them. These human operators need not be collocated with each other, but each can be only with a machine that performs a portion of the program.

The invention additionally includes programs, and methods of operation of the programs. A program is generally defined as a group of steps or operations leading to a desired result, due to the nature of the elements in the steps and their sequence. A program is usually advantageously implemented as a sequence of steps or operations for a processor, such as the structures described above.

Performing the steps, instructions, or operations of a program requires manipulation of physical quantities. Usually, though not necessarily, these quantities may be transferred, combined, compared, and otherwise manipulated or processed according to the steps or instructions, and they may also be stored in a computer-readable medium. These quantities include, for example, electrical, magnetic, and electromagnetic charges or particles, states of matter, and in the more general case can include the states of any physical devices or elements. It is convenient at times, principally for reasons of common usage, to refer to information represented by the states of these quantities as bits, data bits, samples, values, symbols, characters, terms, numbers, or the like. It should be borne in mind, however, that all of these and similar terms are associated with the appropriate physical quantities, and that these terms are merely convenient labels applied to these physical quantities, individually or in groups.

The invention furthermore includes storage media. Such media, individually or in combination with others, have stored thereon instructions of a program made according to the invention. A storage medium according to the invention is a computer-readable medium, such as a memory, and is read by a processor of the type mentioned above. If a memory, it can be implemented in a number of ways, such as Read Only Memory (ROM), Random Access Memory (RAM), etc., some of which are volatile and some non-volatile.

Even though it is said that the program may be stored in a computer-readable medium, it should be clear to a person skilled in the art that it need not be a single memory, or even a single machine. Various portions, modules or features of it may reside in separate memories, or even separate machines. The separate machines may be connected directly, or through a network such as a local access network (LAN) or a global network such as the Internet.

Often, for the sake of convenience only, it is desirable to implement and describe a program as software. The software can be unitary, or thought in terms of various interconnected distinct software modules.

This detailed description is presented largely in terms of flowcharts, algorithms, and symbolic representations of operations on data bits on and/or within at least one medium that allows computational operations, such as a computer with memory. Indeed, such descriptions and representations are the type of convenient labels used by those skilled in programming and/or the data processing arts to effectively convey the substance of their work to others skilled in the art.

A person skilled in the art of programming may use these descriptions to readily generate specific instructions for implementing a program according to the present invention.

Embodiments of an RFID reader system can be implemented as hardware, software, firmware, or any combination. It is advantageous to consider such a system as subdivided into components or modules. A person skilled in the art will recognize that some of these components or modules can be implemented as hardware, some as software, some as firmware, and some as a combination. An example of such a subdivision is now described.

Figure 8:
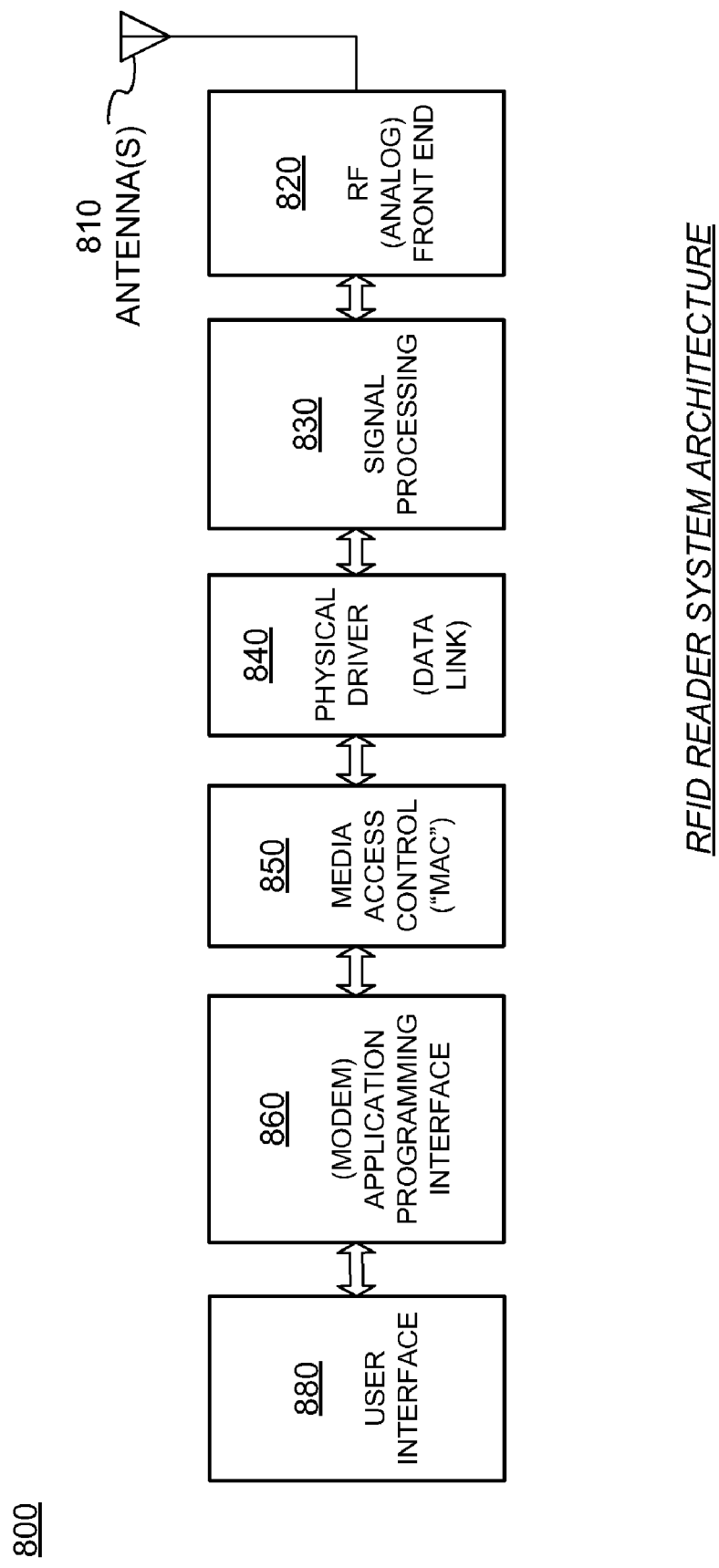
FIG. 8 is a block diagram illustrating an overall architecture of an RFID reader system according to embodiments.

FIG. 8 is a block diagram illustrating an overall architecture of an RFID reader system 800 according to embodiments. It will be appreciated that system 800 is considered subdivided into modules or components. Each of these modules may be implemented by itself, or in combination with others. It will be recognized that some aspects are parallel with those of FIG. 7. In addition, some of them may be present more than once.

RFID reader system 800 includes one or more antennas 810, and an RF Front End 820, for interfacing with antenna(s) 810. These can be made as described above. In addition, Front End 820 typically includes analog components.

System 800 also includes a Signal Processing module 830. In this embodiment, module 830 exchanges waveforms with Front End 820, such as I and Q waveform pairs. In some embodiments, signal processing module 830 is implemented by itself in an FPGA.

System 800 also includes a Physical Driver module 840, which is also known as Data Link. In this embodiment, module 840 exchanges bits with module 830. Data Link 840 can be the stage associated with framing of data. In one embodiment, module 840 is implemented by a Digital Signal Processor.

System 800 additionally includes a Media Access Control module 850, which is also known as MAC layer. In this embodiment, module 850 exchanges packets of bits with module 840. MAC layer 850 can be the stage for making decisions for sharing the medium of wireless communication, which in this case is the air interface. Sharing can be between reader system 800 and tags, or between system 800 with another reader, or between tags, or a combination. In one embodiment, module 850 is implemented by a Digital Signal Processor.

System 800 moreover includes an Application Programming Interface module 860, which is also known as API, Modem API, and MAPI. In some embodiments, module 860 is itself an interface for a user.

All of these functionalities can be supported by one or more processors. One of these processors can be considered a host processor. Such a processor would, for example, exchange signals with MAC layer 850 via module 860. In some embodiments, the processor can include applications for system 800. In some embodiments, the processor is not considered as a separate module, but one that includes some of the above-mentioned modules of system 800.

A user interface 880 may be coupled to API 860. User interface 880 can be manual, automatic, or both. It can be supported by a separate processor than the above mentioned processor, or implemented on it.

It will be observed that the modules of system 800 form something of a chain. Adjacent modules in the chain can be coupled by the appropriate instrumentalities for exchanging signals. These instrumentalities include conductors, buses, interfaces, and so on. These instrumentalities can be local, e.g. to connect modules that are physically close to each other, or over a network, for remote communication.

The chain is used in opposite directions for receiving and transmitting. In a receiving mode, wireless waves are received by antenna(s) 810 as signals, which are in turn processed successively by the various modules in the chain. Processing can terminate in any one of the modules. In a transmitting mode, initiation can be in any one of these modules. Ultimately, signals are transmitted internally, for antenna(s) 810 to transmit as wireless waves.

The architecture of system 800 is presented for purposes of explanation, and not of limitation. Its particular subdivision into modules need not be followed for creating embodiments according to the invention. Furthermore, the features of the invention can be performed either within a single one of the modules, or by a combination of them.

An economy is achieved in the present document in that a single set of flowcharts is used to describe methods in and of themselves, along with operations of hardware and/or software and/or firmware. This is regardless of how each element is implemented.

FIG. 9 is a diagram showing a scenario 900 of an RFID reader 910 tasked with inventorying, i.e. reading the codes of RFID tags 920. Reader 910 and tags 920 can be as in the prior art. In scenario 900, reading is performed under easier conditions. Namely, there are relatively few tags, and they are not moving. Reading a tag code is sometimes informally written as reading a tag.

FIG. 10A is a diagram along a TIME axis, which shows inventorying attempts 1041, 1042, 1043, . . . . These attempts are what reader 910 would transmit with its wave 912, in order to read tags 920 in scenario 900. Inventorying attempt 1041 lasts between times T1 and T2, and inventorying attempts 1042, 1043 take place after that.

Each inventorying attempt 1041, 1042, 1043, . . . includes at least one command. The commands, and the replies that the tags may give in response to them, are part of the applicable communication protocol, assuming that both follow the same protocol. Each set of commands and replies might result in reading a code of the tag, preferably after singulating the tag from the remainder of the tag population. Each inventorying attempt 1041, 1042, 1043, . . . attempts to read all the tags.

FIG. 10B is a diagram along a TIME axis, showing how the tags of FIG. 9 might be read, using the inventorying attempts of FIG. 10A. Inventorying attempt 1041 results in reading of the tags according to reading curve 1061. Similarly, inventorying attempts 1042, 1043 result in reading curves 1062, 1063. According to comment 1069, reading curves 1061, 1062, 1063 show the tags that are read in each attempt.

The shape of each of reading curves 1061, 1062, 1063 is approximate, and also shown in U.S. patent application Ser. No. 11/210,384, published as Document Number 2005/0280505A1, which is incorporated by reference in its entirety. FIG. 9 of that other document shows a succession of inventory rounds, which are one inventorying attempt. FIG. 18G of that other document shows the tags being read in a dashed reading curve (numbered 1898 in that document), as a Q parameter is being varied.

Returning to the present invention, for purposes of knowing about all the tags, a thicker cataloguing line 1080 shows which tags become known to reader 910, and when. Tags become inventoried by being read at least the first time, at which time they also become catalogued. So, cataloguing line 1080 starts at a value NS which represents the number of tags that are to be inventoried, and is reduced to zero by the first reading curve 1061 alone. After that, the subsequent reading curves 1062, 1063 add no new information, and cataloguing line 1080 remains at zero. In that sense, subsequent inventorying attempts 1042, 1043 are redundant in this case. In practice, subsequent inventorying attempts 1042, 1043 are provided to ensure that all tags have been read, even the harder ones to read that might be missed by first inventorying attempt 1041.

In scenario 900, the easier reading conditions are apparent because first inventorying attempt 1041 alone resulted in reading curve 1061 that read all the tags. Subsequent inventorying attempts 1042, 1043, contributed no new tags being inventoried. A more demanding scenario is now described.

Figure 11:
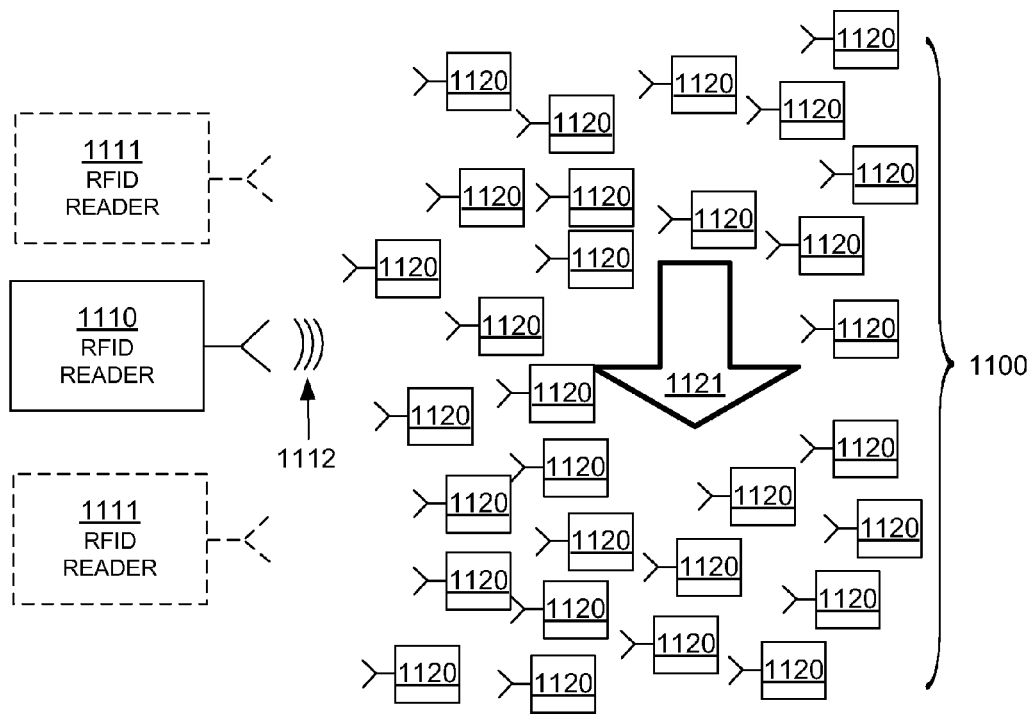
FIG. 11 is a diagram that illustrates a scenario of an RFID reader tasked with inventorying RFID tags under more demanding reading conditions than in the scenario of FIG. 9, in which some tags are harder to read than others.

FIG. 11 illustrates a scenario 1100, of RFID reader 1110 tasked with inventorying RFID tags 1120. Scenario 1100 has more demanding reading conditions than scenario 900, since there can be other readers 1111 nearby, and the population of tags 1120 is both larger, and could be moving, for example according to the direction of arrow 1121. As such, some of tags 1120 are harder to read than others. Reader 1110 transmits a wave 1112, which encodes commands of inventorying attempts 1041, 1042, 1043, . . . .

Figure 12:
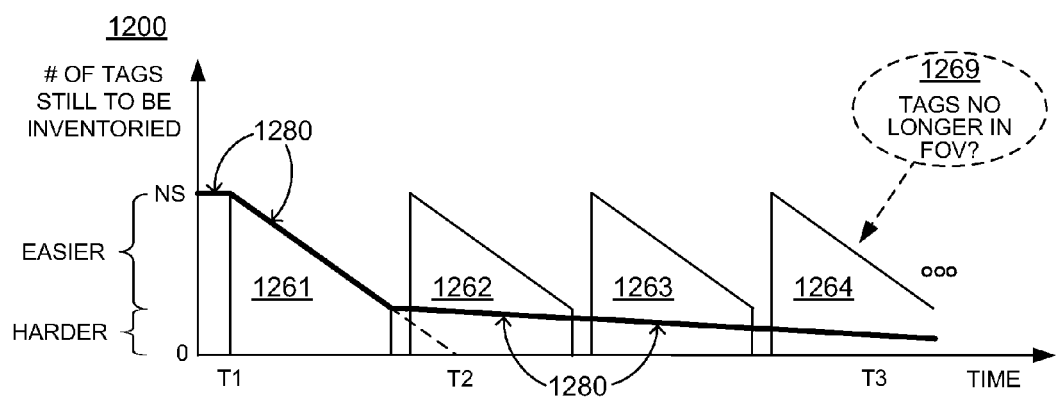
FIG. 12 is a time diagram showing how the tags of FIG. 11 might be read by the reader of FIG. 11 using the inventorying attempts of FIG. 10A.

FIG. 12 is a diagram along a TIME axis showing how tags 1120 might be read by reader 1110. Along the vertical axis, it can be seen that some of the tags in the population are easier to read, while others are harder to read. Four reading curves 1261, 1262, 1263, 1264 are shown. According to comment 1269, after reading curve 1264, the tags may no longer be in the field of view ("FOV"), and any that had not been inventoried by then will be missed. Another term for FOV is reading zone.

A cataloguing line 1280 shows the progress in inventorying the tags. First reading curve 1261 will read all the easier tags. The reading curves 1262, 1263, 1264 of the subsequent attempts will contribute a few more of the harder to read tags. A problem is when not all have been inventoried by the time they leave the field of view. Another problem is when they have to all be inventoried at least twice, to guard against the inclusion of inadvertent stray reads, which could be one-time only.

FIG. 13 is a diagram illustrating contents of a memory 1350 of an RFID tag made according to embodiments. Memory 1350 stores a code 1352 of the tag, which is also known as the tag code, and usually specifies the item that the tag is attached to. A number of codes may be used. For example, code 1352 may be the Electronic Product Code ("EPC"), as specified in the Gen2 Spec.

Memory 1350 also stores an inventoried flag 1356. Flag 1356 is Boolean, in that it is capable of having only two states. Operations of the tag many flip the state from the one value to the other. Some of these operations may be inventorying operations, both in terms of selecting a subgroup of tags in the first place, and also in terms of commanding or not the state of flag 1356 to be flipped upon the tag becoming inventoried. Such an inventoried flag 1356 is specified, for example, in the Gen2 Spec as one of the S0, S1, S2, S3 inventoried flags, whose values can be namely A or B. It should be noted that the Gen2 Spec permits only one of these flags to be used in a session for inventorying.

Memory 1350 further stores an inventoried indicator INV_ID 1360. Inventoried indicator 1360 is updated in conjunction with backscattering the code. As such, it can help control whether a tag will participate in a subsequent inventorying attempt, or refrain to allow others a better chance. It should be noted that inventoried indicator 1360 is distinct from the Select Flag of the Gen2 Spec, which does not become updated in conjunction with backscattering the code.

While code 1352, inventoried flag 1356, and inventoried indicator 1360 are shown stored in memory 1350, they are not necessarily stored in the same part of the memory. They can each be stored under different conditions. For example, code 1352 can be stored in a non-volatile memory that needs no power to be refreshed, even for years. In embodiments according to the Gen2 Spec, inventoried flag 1356 would have persistence as specified in its Table 6.14. And inventoried indicator 1360 has persistence as can be discerned by the person skilled in the art in view of this disclosure.

FIG. 14 is a block diagram of a sample circuit showing how an inventoried indicator of FIG. 13 can be stored according to embodiments. The circuit is part of an overall circuit 1424 of components of the RFID tag circuit. Components 1424 include a tag controller 1432, an energy source 1434, and a register 1436. Energy source 1434 can be volatile or non-volatile, and can provide a Power output to power register 1436, and a State output to tag controller 1432. Register 1436 stores INV_ID 1460, which is input in tag controller 1432, which in turn can determine whether the tag will participate in the inventorying attempt or refrain from it. In addition, tag controller 1432 can reset INV_ID 1460, or input in register 1436 an original value for INV_ID 1460. Moreover, in the embodiments where INV_ID 1460 is treated as a counter, tag controller 1432 can send a command for an operation. One such operation can be to decrement the counter. There can be other embodiments, for the same or different effects.

FIG. 15 is a more detailed schematic circuit diagram 1534 for an embodiment of energy source 1434 of FIG. 14. A switch 1502 can be closed to connect a tag power supply VDD to the Power output. A capacitor 1504 is connected to the same Power output; its size can determine the persistence of the power, after switch 1502 is opened, or VDD is lost. An Analog-to-Digital Converter (ADC) 1506 can sample the voltage on capacitor 1504, and feed a resulting value to a comparator 1508. Comparator 1508 can provide the State output, and also control opening and closing switch 1502. There can be other embodiments, for the same or different effects.

Figure 16:
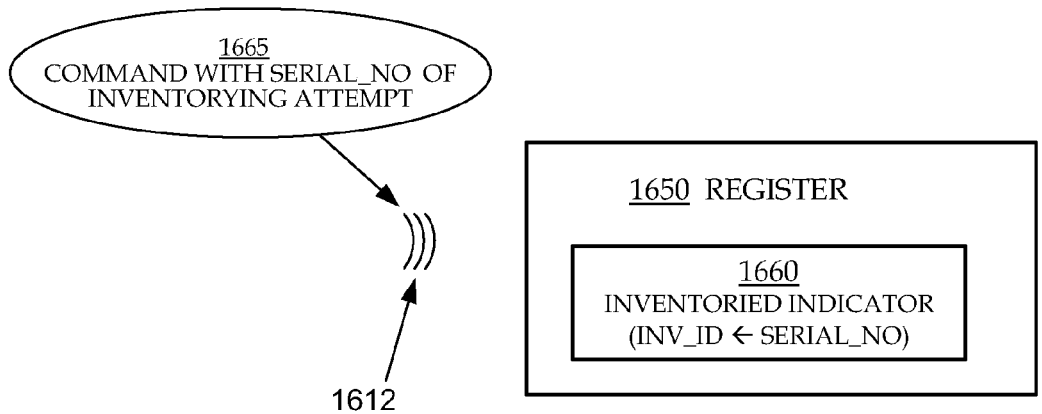
FIG. 16 is a conceptual diagram illustrating an embodiment where the inventoried indicator of FIG. 13 is updated from a serial number conveyed by an inventorying RFID reader according to embodiments.

FIG. 16 is a conceptual diagram illustrating an embodiment where a register 1650 stores an inventoried indicator 1660. Inventoried indicator 1660 becomes updated from a wave 1612 that is received from a reader. According to a comment 1665, wave 1612 encodes a command that has a serial number SERIAL_NO of a group of inventorying attempts. This serial number SERIAL_NO is to be distinguished from other serial numbers, such as the tag code and the like. The serial number SERIAL_NO is learned from the command, and input in register 1650 as the new value INV_ID for inventoried indicator 1660. In such embodiments, the reader plays a role in the tag's refraining behavior from the other attempts in the group.

Figure 17:
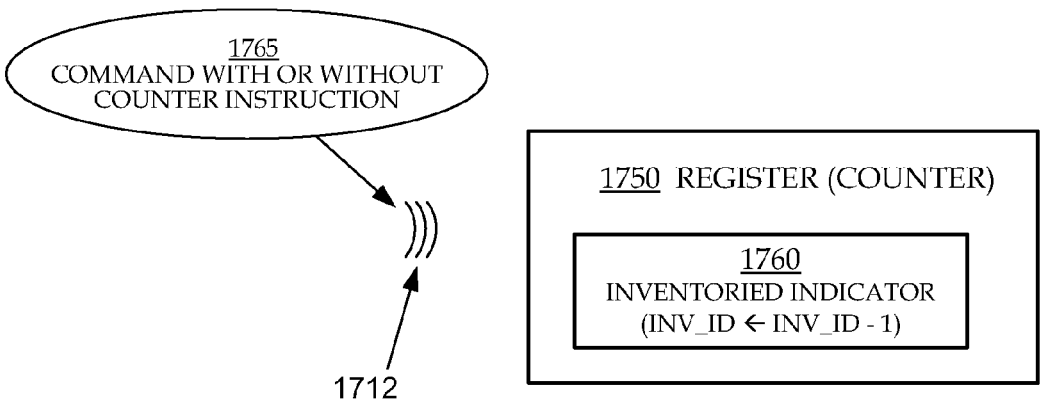
FIG. 17 is a conceptual diagram illustrating embodiments where the inventoried indicator of FIG. 13 is a counter that may or may not be updated by an inventorying RFID reader.

FIG. 17 is a conceptual diagram illustrating an embodiment where a register 1750 stores an inventoried indicator 1760, and is part of a counter. Inventoried indicator 1760 may or may not become updated from a wave 1712 received from a reader. According to a comment 1765, wave 1712 encodes a command that may or may not have an instruction for a counter, as will be described in more detail later in this document. In such embodiments, the reader may or may not play a role in the tag's refraining behavior.

Figure 18:
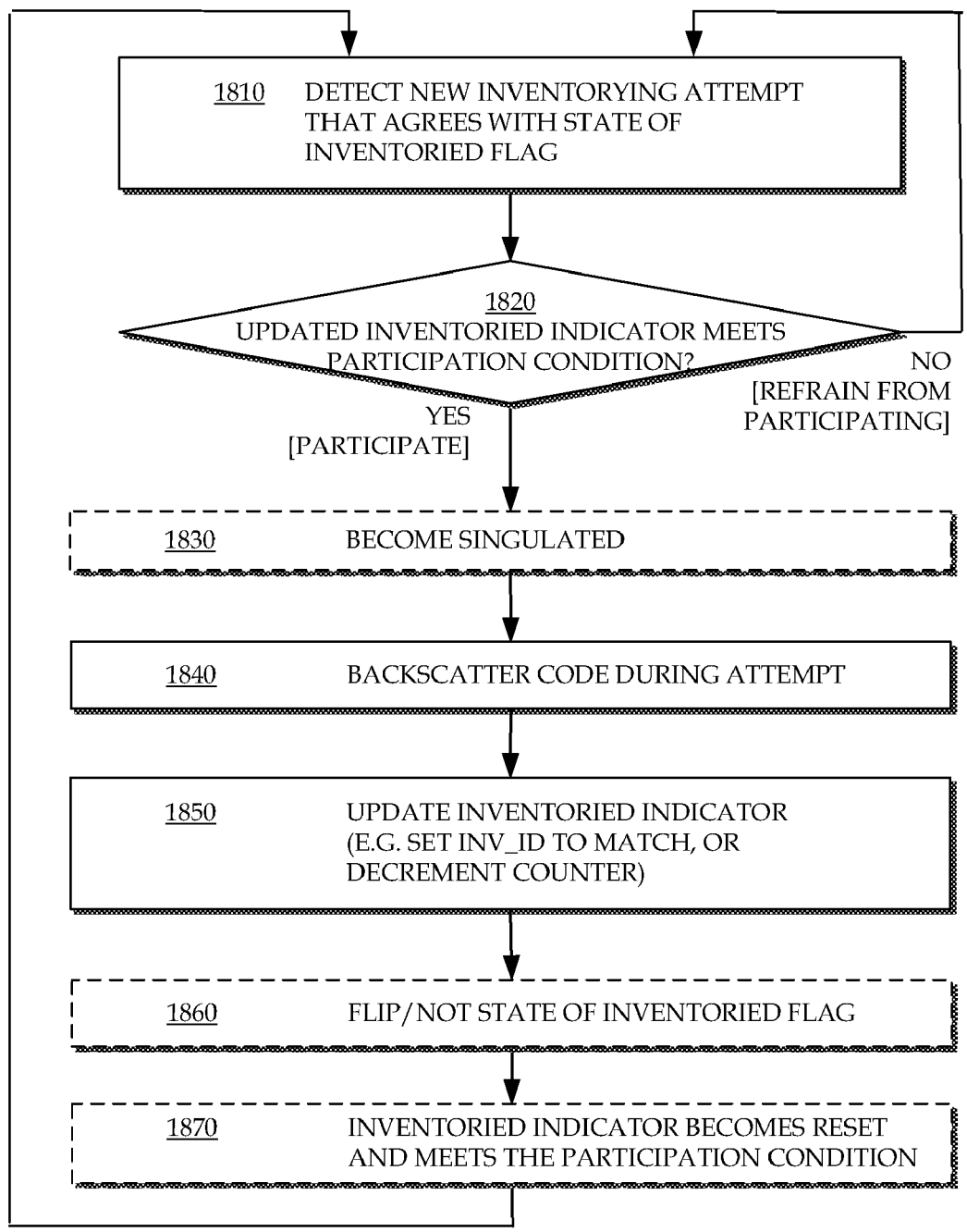
FIG. 18 is a flowchart illustrating tag methods according to embodiments of the present invention.

FIG. 18 is flowchart 1800 illustrating methods according to embodiments. The method of flowchart 1800 may be practiced by different embodiments of the invention, including but not limited to RFID tags, IC chips for RFID tags, and so on, which store in a memory a code, an inventoried flag capable of being flipped between two states, and an inventoried indicator, as described above.

Flowchart 1800 may be repeated a number of times, as a loop. For example, the tag may go through that loop once for every inventorying attempt, such as for the inventorying attempts described above. That is why, although the individual operations flowchart 1800 will be described in a certain order, they may take place in a different order.

At operation 1810, a first attempt to read the code is detected. The first attempt can be an inventorying attempt, as per the above. The first attempt agrees with a current state of the flag, in that it calls for it exactly, or does not call for a condition that would contradict it.

At optional next operation 1820, it is determined whether the inventoried indicator, as has been most recently updated, meets a participation condition. Examples of the participation condition will be described later in this document. The inventoried indicator can be updated at a later operation 1850.

If the participation condition is not met, the tag will refrain, according to embodiments. This means that execution may return to operation 1810, waiting to detect the onset of another inventorying attempt that agrees with a current state of the flag. Along with returning to operation 1810, the tag may backscatter an error code, indicating that it is present but will not fully properly participate. Or it may backscatter nothing. If, however, the participation condition is indeed met, then the tag may participate plus update its inventoried indicator, as per the below.

At optional next operation 1830, the tag becomes singulated from the population of tags it is with. This can be performed by the reader and the tag performing steps appropriate for the applicable communication protocol. Singulation will thus ensure that all the other tags in the population will not be responding, so that the reader can discern the forthcoming backscatter from the tag.

At next operation 1840, the code is backscattered responsive to the first attempt.

At next operation 1850, the inventoried indicator is updated in conjunction with backscattering the code. In terms of exact operation, the inventoried indicator can be updated after backscattering the code, or concurrently with it, or before it.

At next operation 1860, the state of the inventoried flag is flipped or not, responsive to the first attempt. For example, the first attempt may include an instruction to flip or not flip the inventoried flag. Or it may not include such an instruction, but by its structure it might cause the inventoried flag to be flipped or not.

At optional next operation 1870, the updated inventoried indicator becomes reset, such that the inventoried indicator now meets the participation condition. This operation may also take place at other times in flowchart 1800, for example if after operation 1820 it has been determined to refrain from participating.

Resetting may take place in any number of ways. In some embodiments, this can be automatic after enough time passes. For example, there can be a preset time that elapses from an event, and then there is reset. Alternately a suitable Reset command can be receiving wirelessly.

Execution then can return to operation 1810. Or, since operation 1870 is optional, execution can return to operation 1810 after operation 1860, instead. Operation 1810 may be reached either without losing power in the tag since operation 1860 was executed, or with losing and regaining power.

Once back at operation 1810, a second inventorying attempt can be detected, which can agree with a current state of the flag. Then, again according to operation 1820, it is again determined whether the inventoried indicator, updated at operation 1860, meets the participation condition. It might not meet it, due to the update. If it does, then the above sequence of operations can be repeated, and so on.

In some embodiments, the reader also transmits a serial number in association with the first attempt, and the tag receives it. The serial number can be transmitted and received in any suitable way. One suitable way for transmitting it is via a Select command or a BlockWrite of the Gen2 Spec, as is described later in this document.

Then the inventoried indicator can be updated by being set to a new value. The new value can be the serial number itself, or another number determined from the serial number. In some of these embodiments, the participation condition can refer to whether the updated inventoried indicator differs from the new value. So, when a new attempt is detected, if it corresponds to the same serial number, the tag will know to refrain, and the participation condition can be defined accordingly so as to effectuate the refraining, for example by returning to operation 1810 directly from operation 1820. If the new attempt corresponds to a different serial number, there will be participation. The new attempt could be from a different reader, or from the same reader that wants to inventory again all the tags in its field of view. The latter embodiment can take place if the reader is confident that it has inventoried all tags, and does not need any of them to refrain from the second attempt.

The serial number can be specific to a group of forthcoming attempts by a reader. Plus, if two readers are cooperating, they could use the same serial number. This way, once a tag is inventoried by one of the readers, it will refrain from being read also by the other. The serial number could also be specific to the reader, which is useful if two readers have overlapping fields of view. This way, once a tag is inventoried by one of the readers, it will refrain from being read by it. But it will not refrain from being read by the other reader. In some of these embodiments, the tag can maintain a list of such serial numbers, so as to be able to refrain from being read by multiple readers.

Figure 19:
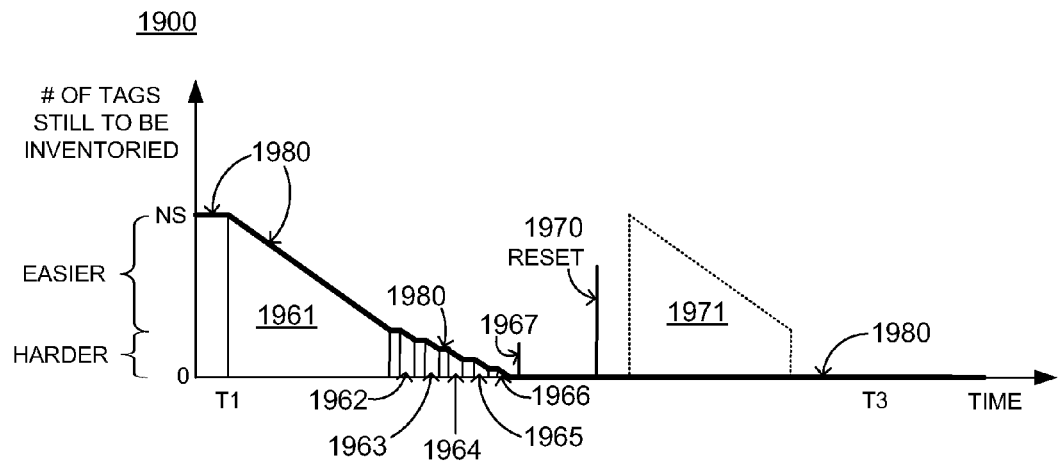
FIG. 19 is a time diagram illustrating tags being read, where some tags are harder to read than others, but also where tags that have already been inventoried refrain from participating in more than one subsequent inventorying attempt according to embodiments.

FIG. 19 is a diagram 1900 along a TIME axis, similar to FIG. 12, but which results from embodiments. Diagram 1900 illustrates tags being read by reading curves 1961, 1962, 1963, 1964, 1965, 1966, 1967. The tags read by each one of these reading curves do not participate in the subsequent ones, thus enabling tags that are harder and harder to be searched for and found. Accordingly, a cataloguing line 1980 starts at NS and comes down to zero rather quickly, while that of FIG. 12 never did. In FIG. 19, finding all the tags proceeds faster, because each subsequent inventorying attempt does not have to read again tags that have already been found. The contrast is illustrated by repeating times T1, T3 in both FIG. 12 and FIG. 19. The better performance according to the invention was made possible in FIG. 19 because tags, once inventoried, refrained from participating.

In fact, in this example, reading curve 1967 returned no new tags. As such, there was a Reset command 1970, and then another reading curve 1971, starting again from all the tags.

The reading curves and cataloguing line of FIG. 19 can be caused by any number of operations by the reader. Two alternative examples are now described, with reference to FIGS. 20 and 21.

Figure 20:
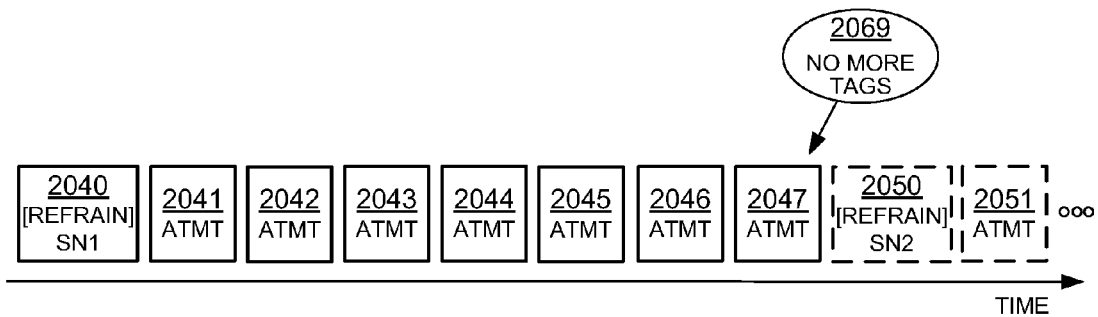
FIG. 20 is time diagram showing repeated inventorying attempts that may be transmitted according to embodiments and received, so as to generate the result of FIG. 19.

FIG. 20 is time diagram showing repeated inventorying attempts that may be transmitted according to embodiments and received, so as to generate the result of FIG. 19. A group of inventorying attempts 2041, 2042, 2043, 2044, 2045, 2046, 2047 has an associated serial number SN1. This serial number SN1 is transmitted via an earlier command 2040, in the context of the refraining feature. Attempts 2041, 2042, 2043, 2044, 2045, 2046, 2047 could have generated reading curves 1961, 1962, 1963, 1964, 1965, 1966, 1967, respectively.

According to comment 2069, attempt 2047 returned no new tags. A command 2050 can transmit a second serial number SN2 for the next forthcoming group. Command 2050 can operate as Reset command 1970. Then another attempt 2051 can result in another reading curve 1971, and so on.

Figure 21:
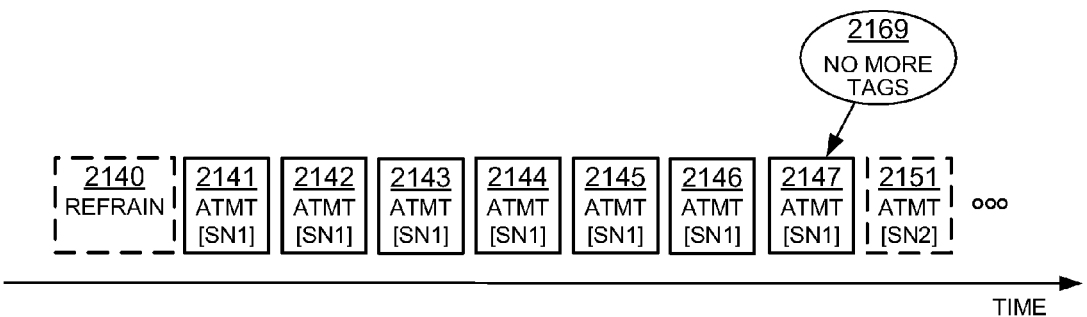
FIG. 21 is another time diagram showing repeated inventorying attempts that may be transmitted according to embodiments and received, so as to generate the result of FIG. 19.

FIG. 21 is another time diagram showing repeated inventorying attempts that may be transmitted according to embodiments and received, so as to generate the result of FIG. 19. A group of inventorying attempts 2141, 2142, 2143, 2144, 2145, 2146, 2147 has an associated serial number SN1. This serial number SN1 is transmitted within each one of these attempts. Attempts 2141, 2142, 2143, 2144, 2145, 2146, 2147 could have generated reading curves 1961, 1962, 1963, 1964, 1965, 1966, 1967, respectively.

According to comment 2169, attempt 2147 returned no new tags. Then another attempt 2151 can result in another reading curve 1971, and so on. Attempt 2151 can include the second serial number SN2 of its own group, and thus no Reset command is needed.

Returning to FIG. 19, it will be observed that each tag was inventoried only once, and tags were not read again until there was confidence that all tags had been inventoried. Sometimes, however, it is desired to read tags more than once, for example so as to validate against a tag code arising spuriously. In some sample instances, a rule can be implemented that, unless a tag is read redundantly, for example at least twice, it will be considered a stray read, and thus not counted. The invention can help in such instances, by having tags refrain from being counted more than twice. Examples are now described, which can be different from where the inventoried indicator was a serial number.

In some embodiments, the inventoried indicator is a number, which is stored in a counter. For example, register 1436 would store that number. Updating the inventoried indicator can be performed by adjusting the number in the counter, and the participation condition is that the number in the counter has not reached a limit. This can be implemented in many ways. For example, the number in the counter can be adjusted by being incremented up to some limit. Or, the number in the counter can be adjusted by being decremented down to a limit. In some of these embodiments, that limit can be zero.

In some embodiments, this feature operates autonomously. In others, assistance from the reader is called for. The reader can enable the feature, or disable it, if that is called for. Optionally, the reader can transmit and the tag can receive a participation parameter. Then a number initially stored in the counter, or the limit, can be determined from the received participation parameter. The participation parameter can be received via a Select command or a BlockWrite of the Gen2 Spec, or other suitable commands.

The number in the counter and the limit thus determine in how many attempts the tag will participate, before it starts refraining. For example, if the number in the counter starts from 1, and counts down to zero, the tag will participate only once, and the profile of FIG. 19 will result. A different example is now described, where each tag participates twice.

FIG. 22 is a time diagram illustrating tags being inventoried, where some tags are harder to read than others, but where also the tags limit themselves to participating in only two inventorying attempts and then refrain, according to embodiments. FIG. 22 is a diagram 2200 along a TIME axis, similar to FIG. 12, but which results from embodiments. Diagram 2200 illustrates tags being read by reading curves 2261, 2262, 2263, 2264, 2265, 2266, 2267, 2268. After each tag participates in two of these reading curves, it refrains from participating in the subsequent ones, thus enabling the harder to read tags to be found. Accordingly, a cataloguing line 2280 starts at NS and comes down to zero. This took longer time than in FIG. 19, but still less time than in FIG. 12. The reading curves and cataloguing line of FIG. 22 can be caused by any number of operations by the reader, as will be discerned by the reader in view of the present disclosure.

In some embodiments, a tag refrains from being inventoried in subsequent rounds as per the above. In others, it does that only when the tag is in an enabled state, as opposed to a disabled state. An example is now described.

FIG. 23 is an optional partial state diagram 2348 of a state machine of a tag having an electrical circuit as shown in FIG. 4. State diagram 2348 can be implemented by a state machine in processing block 444. State diagram 2348 includes an enabled state 2365 and a disabled state 2385, which can be states as described above. The tag can transition between enabled state 2365 and disabled state 2385 in any number of ways. For example, it can be in one of these two states when powered initially, and then transition if a condition is met. The condition can be that enough time has passed from an event. In addition, the condition can be that an Enable Refraining command 2360 and/or a Disable Refraining command 2380 are received, which cause the state of the tag to transition between enabled state 2365 and disabled state 2385.

In some embodiments, enabled state 2365 and disabled state 2385 are provided in a way that does not define additional states in the underlying protocol. For example, for the Gen2 Spec, the initial Ready state can be disabled state 2385, while one or more of the other states can be enabled states 2365. Or some of the other states can also be characterized as disabled state 2385.

In other embodiments, either one or both of enabled state 2365 and disabled state 2385 can be provided as states different from, and in addition to what is required by the Gen2 Spec.

Figure 24:
FIG. 24 is a diagram illustrating commands that may be transmitted by a reader system component according to embodiments.

FIG. 24 is a diagram illustrating commands that may be transmitted by a reader according to embodiments. A wave 2412 is a special case of wave 112 of FIG. 1. An Enable Refraining command 2460 can be sent first, for example to have the effect of Enable Refraining command 2360. An inventorying with refraining command 2470 can be sent next, for example to have the effect of standalone command 2040, 2050, 2140, or be a variation of a command in attempt 2041 or 2141. Then a Disable Refraining command 2480 can be sent, for example to have the effect of Disable Refraining command 2380.

As will be realized, commands 2460, 2470, 2480 can be configured in any number of ways. For example, if Enable Refraining command 2460 is provided, it can be separate from command 2470. Preferably, these are configured as separate standalone commands, each occurring at a single one of the communication sessions such as those of time interval 312 of FIG. 3. In addition, the tag need not backscatter a reply to any one of them individually.

In addition, command 2470, plus optionally commands 2460 and 2480, may be used among other commands that will be transmitted to the tag in question, and possibly other tags. Equally, the optional first and second replies will be among other replies backscattered by the tag in question, and possibly other tags.

Figure 25:
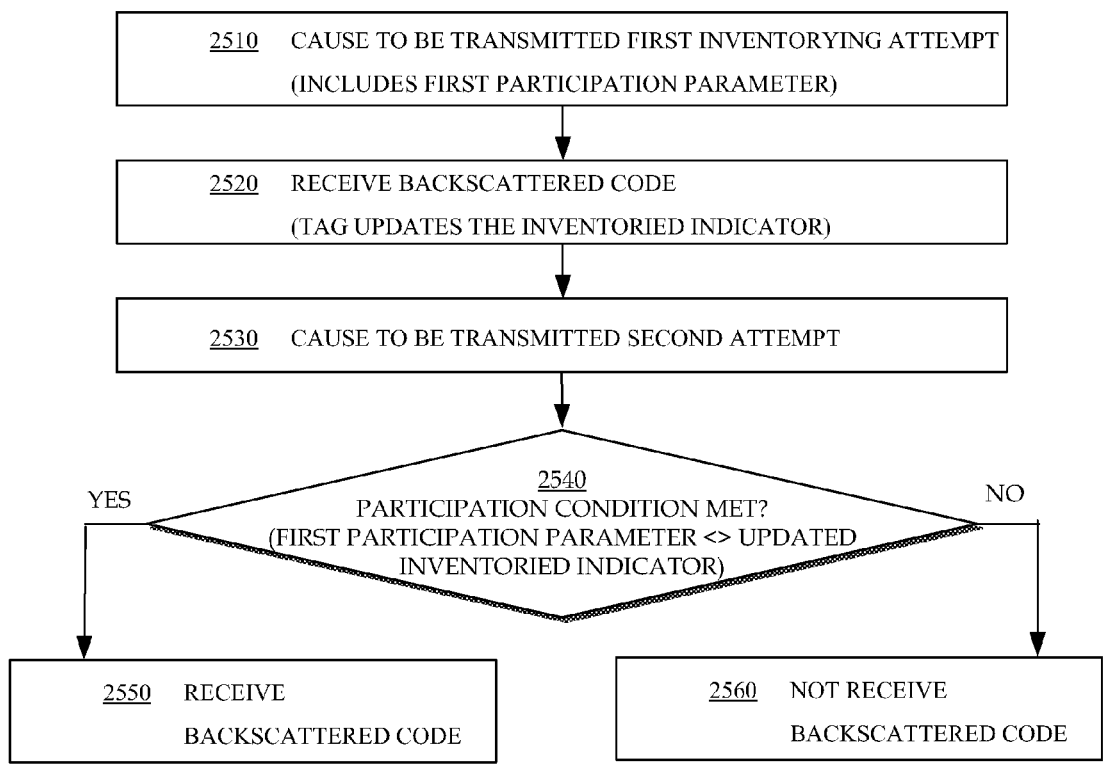
FIG. 25 is a flowchart illustrating methods for RFID reader system components according to embodiments of the present invention.

FIG. 25 is flowchart 2500 illustrating a method according to other embodiments of the invention. The method of flowchart 2500 may be practiced by different embodiments of the invention, including but not limited to RFID reader systems, readers, related components, software, and so on. The method is for communicating with an RFID tag storing a code, an inventoried flag capable of being flipped between two states, and an inventoried indicator, as per the above. In addition, details of the method of flowchart 2500 can be also understood with reference to what was written above.

At operation 2510, a first attempt to read the code is caused to be transmitted wirelessly, which agrees with a current state of the inventoried flag, and includes a first participation parameter. The first participation parameter can be any suitable parameter. In some embodiments, for example, it is a serial number that is associated with the first attempt, as per the above. In other embodiments, the inventoried indicator includes a number stored in a counter, which is determined from the received participation parameter. In other words, the first participation parameter is used to help determine the number in the counter. The first participation parameter can be caused to be transmitted in any suitable way, for example as part of a command, a parameter of a command, and so on. For implementations of the Gen2 Spec, such can be a Select command, a BlockWrite command, and so on.

At next operation 2520, the backscattered code is received from the tag responsive to the first attempt. Concurrently with the first attempt, the tag may further update the inventoried indicator in conjunction with backscattering the code, and flip or not the state of its inventoried flag, as also per the above.

At next operation 2530, a second attempt to read the code is caused to be transmitted wirelessly. This second inventorying attempt agrees with a current state of the inventoried flag.

At optional next operation 2540, it is determined whether a participation condition is met. The participation condition refers to whether the updated inventoried indicator differs from the first participation parameter. The inventoried indicator may have been updated concurrently with receiving the backscattered code at operation 2520.

If, at operation 2540, the participation condition is met, then at optional next operation 2550, the backscattered code is received responsive to the second attempt, as it was also received in operation 2520. Else, at optional next operation 2560, the backscattered code is not received, as per the above.

Returning to FIG. 24, each one of commands 2460, 2470, 2480 can be constructed in any number of ways. In some instances, they can be considered as custom commands as not being specified in a particular communication protocol. In some instances they would be standalone commands, made by a sequence of bits chosen so that they do not conflict with other commands of the protocol. In other instances, they can be commands with a custom payload. Such commands can be known to the protocol or not, and the payload can be used to distinguish among different custom commands, and optionally further transfer a parameter for the commands.

When commands are used that are known to the protocol, a section of their payload can be advantageously used for the purpose of implementing a custom command, such as commands 2460, 2470, 2480. Such a section in the payload can be a mask field, according to embodiments. For the Gen2 Spec, two such commands are the Select command and the BlockWrite command. Between these two candidate commands, it should be considered that the Select command can be transmitted before or after a tag is singulated out of its population, while the BlockWrite is better suited for singulated tags. In addition, the BlockWrite command is optional to the Gen2 Spec, and the tag would probably have to have a controller that can accept it.

Each one of commands 2460, 2470, 2480 can thus be constructed as an implementation of this Select command or the BlockWrite command. An example is now described in terms of the Select command, but would apply equally to the BlockWrite command.

FIG. 26A is a table illustrating the fields of the Select command of the Gen2 Spec. Version 1.1.0 of the Gen2 Spec is hereby incorporated by reference in its entirety. The fields of this Select command are explained in more detail in the above mentioned Gen2 Spec. In addition, the implementation of this Select command can have a custom payload so that it operates as any one of commands 2460, 2470, 2480 and/or another custom command.

FIG. 26B is a table illustrating how a number of custom commands can be enabled in a reader and a tag. EBV stands for Extensible Bit Vector. The Mask Field can be partitioned as shown, into two primary subfields, named FEF and FCF.

The Feature Enabling Field (FEF) enables the tag to verify that it is a proper recipient for the command, by comparing the transmitted FEF value against a value in Membank. In this case, Membank can be EPC, TID or USER memory. As can be seen, the FEF can be further partitioned into subfields, for better clarity. Such subfields can include a Class Identifier, the MDID, and an Indicator Bit.

The Class Identifier can be two bits. For example, EPCglobal can correspond to a value of 10. This would allow the custom command to apply, for example, only to EPCglobal tags.

The MDID is the tag manufacturer's ID, which is stored in the tag's TID memory. For Impinj tags, this number is 000000000001 or 100000000001. The MDID allows a reader to select tags of only the manufacturer of interest. So, even if this Select command is transmitted and received before singulation, the Select command can select also according to the tag manufacturer's ID. This will cause the manufacturer's tags to be selected, and thus the reader can ensure prior knowledge of the tag manufacturer's identification.

The Indicator Bit can be set to 0 or 1. In the Gen2 Spec, a tag model number follows the MDID. A bit of this model number can serve as the Indicator Bit, and can be interpreted as follows: If it is 0, the tags can interpret the command as an "ordinary" Select, and execute it per the Gen2 spec. Else, if it is 1, the tags can interpret the Select command as a custom instruction, and execute according to the FCF.

The Feature Command Field (FCF) can have a command code that indicates the number of the custom instruction. For example, a command code of 00000 could be the custom command. This permits 31 possible custom commands. In addition, a command code of 11111 could indicate an extended command code that extends into the subsequent data field.

The data field can contain data needed to implement the custom instruction, if any. Not all commands will use it. The data field can be variable in size. Its meaning will derive from the command codes.

In some embodiments, the tag may ignore the Target and Action field in the Select command, depending on whether these fields are relevant to the CI. In other embodiments, the tag may also set the appropriate flag.

In preferred embodiments, the entire Select command must be valid for the tag to accept and execute the custom command. That means valid values for Membank, Length, Pointer, Mask, CRC-16, etc. An example is now described.

FIG. 26C is a table showing sample values that can be used for the table of FIG. 26B. These could be used for a custom command. The Membank has a binary value of 10 point to the TID memory. The pointer has a hex value of 06 h points to the last two bits of the class identifier. The length has a hex value of 14 h points to a length of 20 bits that follow thereafter.

Everything described above in terms of readers and reader components finds some correspondence with tags and tag chips. In some instances, some of the above also describe features and behavior of tag chips.

Numerous details have been set forth in this description, which is to be taken as a whole, to provide a more thorough understanding of the invention. In other instances, well-known features have not been described in detail, so as to not obscure unnecessarily the invention.

The invention includes combinations and subcombinations of the various elements, features, functions and/or properties disclosed herein. The following claims define certain combinations and subcombinations, which are regarded as novel and non-obvious. Additional claims for other combinations and subcombinations of features, functions, elements and/or properties may be presented in this or a related document.

The invention claimed is:

1. An Integrated Circuit (IC) chip for use with a Radio Frequency Identification (RFID) tag having an antenna, comprising:
    a memory storing an inventoried indicator; and
    a processing block coupled with the memory and operable to:
        receive an inventorying command including a first serial number identifying an RFID reader;
        reply to the inventorying command;
        store the first serial number as an updated inventoried indicator;
    receive again the inventorying command including a second serial number instead of the first serial number;
        compare the second serial number to the updated inventoried indicator;
        if the second serial number is different from the updated inventoried indicator, then reply and store the second serial number as the updated inventoried indicator otherwise refrain from replying.

2. The IC chip of claim 1, wherein the processing block is further operable to:
    reset the inventoried indicator after a preset time.

3. The IC chip of claim 1, wherein the processing block is further operable to:
    receive from the reader a reset command configured to reset the inventoried indicator.

4. The IC chip of claim 1, wherein the first serial number is generated at random.

5. The IC chip of claim 1, wherein the first serial number is generated so as to not conflict with another serial number used by another reader.

6. The IC chip of claim 1, wherein the reader cooperates with another reader using the first serial number.

7. A Radio Frequency Identification (RFID) tag, comprising:
    an antenna;
    a memory for storing a code, an inventoried flag capable of being flipped between two states, and an inventoried indicator; and
    a processing block coupled with the antenna and operable to:
        receive an inventorying command including a first serial number identifying an RFID reader;
        reply to the inventorying command;
        store the first serial number as an updated inventoried indicator;
    receive again the inventorying command including a second serial number instead of the first serial number;
        compare the second serial number to the updated inventoried indicator;
        if the second serial number is different from the updated inventoried indicator, then reply and store the second serial number as the updated inventoried indicator otherwise refrain from replying.

8. The RFID tag of claim 7, wherein the processing block is further operable to:
    reset the inventoried indicator after a preset time.

9. The RFID tag of claim 7, wherein the processing block is further operable to:
    receive from the reader a reset command configured to reset the inventoried indicator.

10. The RFID tag of claim 7, wherein the first serial number is generated at random.

11. The RFID tag of claim 7, wherein the first serial number is generated so as to not conflict with another serial number used by another reader.

12. The RFID tag of claim 7, wherein the reader cooperates with another reader using the first serial number.

13. A method for a Radio Frequency Identification (RFID) tag storing a code, an inventoried flag capable of being flipped between two states, and an inventoried indicator, comprising:
    receiving an inventorying command including a first serial number identifying a RFID reader;
    replying to the inventorying command;
    storing the first serial number as an updated inventoried indicator;
    receive again the inventorying command including a second serial number instead of the first serial number;
    comparing the second serial number to the updated inventoried indicator;
    if the second serial number is different from the updated inventoried indicator, then replying and storing the second serial number as the updated inventoried indicator otherwise refraining from replying.

14. The method of claim 13, further comprising:
    resetting the inventoried indicator after a preset time.

15. The method of claim 13, further comprising:
    receiving from the reader a reset command configured to reset the inventoried indicator.

16. The method of claim 13, wherein the first serial number is generated at random.

17. The method of claim 13, wherein the first serial number is generated so as to not conflict with another serial number used by another reader.

18. The method of claim 13, wherein the reader cooperates with another reader using the first serial number.

* * * * *

UNITED STATES PATENT AND TRADEMARK OFFICE
CERTIFICATE OF CORRECTION

PATENT NO. : 8,279,045 B2  Page 1 of 1
APPLICATION NO. : 12/057467
DATED : October 2, 2012
INVENTOR(S) : Diorio et al.

It is certified that error appears in the above-identified patent and that said Letters Patent is hereby corrected as shown below:

In the Specifications

Delete "10" in column 5, line 17 and insert -- 110 --, therefor,

Delete "326 here" in column 5, line 24 and insert -- 326-here --, therefor, and

Delete "860 MHz 960 MHz" in column 5, line 60 and insert -- 860 MHz-960 MHz --, therefor.

Signed and Sealed this
Sixth Day of May, 2014

Michelle K. Lee
*Deputy Director of the United States Patent and Trademark Office*